(12) United States Patent
Banjouya et al.

(10) Patent No.: US 12,340,054 B2
(45) Date of Patent: Jun. 24, 2025

(54) TOUCH PANEL AND DISPLAY DEVICE

(71) Applicant: Shanghai Tianma Micro-Electronics Co., Ltd., Shanghai (CN)

(72) Inventors: Akira Banjouya, Kanagawa (JP); Hitoshi Yoshida, Kanagawa (JP); Akira Suzuki, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/526,252

(22) Filed: Dec. 1, 2023

(65) Prior Publication Data
US 2024/0211081 A1   Jun. 27, 2024

(30) Foreign Application Priority Data

Dec. 23, 2022 (JP) .................. 2022-206746
Aug. 24, 2023 (JP) .................. 2023-136433

(51) Int. Cl.
*H01L 27/32* (2006.01)
*G06F 3/041* (2006.01)
*G06F 3/044* (2006.01)

(52) U.S. Cl.
CPC .......... *G06F 3/0443* (2019.05); *G06F 3/0412* (2013.01); *G06F 3/0446* (2019.05)

(58) Field of Classification Search
CPC ............. G06F 3/04184; G06F 3/04162; G06F 3/03545; G06F 3/044; G06F 2203/04107; G06F 3/0448

USPC .......................................... 349/12
See application file for complete search history.

(56) References Cited

U.S. PATENT DOCUMENTS

| 2014/0139761 A1* | 5/2014 | Yanagawa ............. G06F 3/0448 349/12 |
| 2019/0152194 A1 | 5/2019 | Schmalbuch et al. |
| 2019/0227651 A1 | 7/2019 | Kato et al. |

FOREIGN PATENT DOCUMENTS

| JP | 2015-090577 A | 5/2015 |
| JP | 2017-182213 A | 10/2017 |
| JP | 2022-022212 A | 2/2022 |
| WO | 2018/047619 A1 | 3/2018 |

* cited by examiner

*Primary Examiner* — Abdul-Samad A Adediran
(74) *Attorney, Agent, or Firm* — Sughrue Mion, PLLC

(57) ABSTRACT

A touch panel includes a first substrate, a cover that is formed from glass and that is overlaid on the first substrate, and a first adhesive layer that adheres the first substrate to the cover. The first substrate includes a base that is formed from glass and that includes a detection region and a surrounding region surrounding the detection region, a plurality of first electrodes that is disposed in the detection region of a first main surface of the base, and that extends in a first direction, and an organic thin film that is formed on the first main surface of the base, and that covers the plurality of first electrodes. The first adhesive layer directly adheres the organic thin film to the cover, and the surrounding region of the first main surface of the base to the cover.

11 Claims, 16 Drawing Sheets

TOUCH PANEL AND DISPLAY DEVICE

CROSS-REFERENCE TO RELATED APPLICATIONS

This application claims the benefit of Japanese Patent Application No. 2022-206746, filed on Dec. 23, 2022, and Japanese Patent Application No. 2023-136433, filed on Aug. 24, 2023, of which the entirety of the disclosures is incorporated by reference herein.

FIELD OF THE INVENTION

The present disclosure relates generally to a touch panel and a display device.

BACKGROUND OF THE INVENTION

In order to enhance the safety of riders (crew, passengers, and the like) on vehicles, trains, and the like, it is necessary to reduce injury done to the riders by display devices provided in the vehicles, trains, and the like. For example, the European standards for vehicles (ECE-R21: the Economic Commission for Europe of the United Nations (UN/ECE)-Regulation No. 21) apply to the interior components of vehicles, including touch panels, display devices, and the like. ECE-R21 requires that the internal components of vehicles are safe at a time of collision of the vehicle.

In touch panels, a cover is affixed to a substrate including electrodes in order to protect the substrate including electrodes. Additionally, a protection layer covering the electrodes is provided on the substrate in order to protect the electrodes. For example, Unexamined Japanese Patent Application Publication No. 2015-90577 describes a capacitance touch panel sensor substrate in which a protection layer formed from an organic film is formed on the entire surface of a display region and a frame layer.

In cases in which the cover is affixed, by an adhesive layer, to a surface of the substrate on which the protection layer is formed, at the time of collision of the vehicle, fragments of the substrate may peel from the adhesive layer due to insufficient adhesion adhering the cover to the protection layer, and scatter.

SUMMARY OF THE INVENTION

A touch panel according to a first aspect of the present disclosure includes:
a first substrate;
a cover that is formed from glass and that is overlaid on the first substrate; and
a first adhesive layer that adheres the first substrate to the cover, wherein
the first substrate includes
 a base that is formed from glass and that includes a detection region and a surrounding region surrounding the detection region,
 a plurality of first electrodes that is disposed in the detection region of a first main surface of the base and that extends in a first direction, and
 an organic thin film that is formed on the first main surface of the base and that covers the plurality of first electrodes, and
the first adhesive layer directly adheres the organic thin film to the cover, and the surrounding region of the first main surface of the base to the cover.

A display device according to a second aspect of the present disclosure includes:
the touch panel described above; and
a display panel overlaid on the touch panel.

A display device according to a third aspect of the present disclosure includes:
the touch panel described above;
a display panel that is overlaid on the touch panel, and that includes a display region that displays a display element and a periphery region adjacent to the display region; and
a second adhesive layer that adheres the touch panel to the display panel, wherein
the second adhesive layer directly adheres a second main surface of a side opposite the first main surface of the base to the periphery region of a main surface of a substrate formed from glass of the display panel.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, a touch panel and a display device according to various embodiments are described while referencing the drawings.

Embodiment 1

A touch panel 10 and a display device 200 according to the present embodiment are described while referencing FIGS. 1 to 6. The touch panel 10 is implemented as a capacitive touch panel. As described later, the touch panel 10 and a display 100 constitute the display device 200. The display device 200 is mounted in a vehicle, an airplane, on a household appliance, a piece of furniture, or the like. In the present embodiment, an example is described in which the touch panel 10 and the display device 200 are mounted in a vehicle. A rider of the vehicle corresponds to a user.

Figure 1:
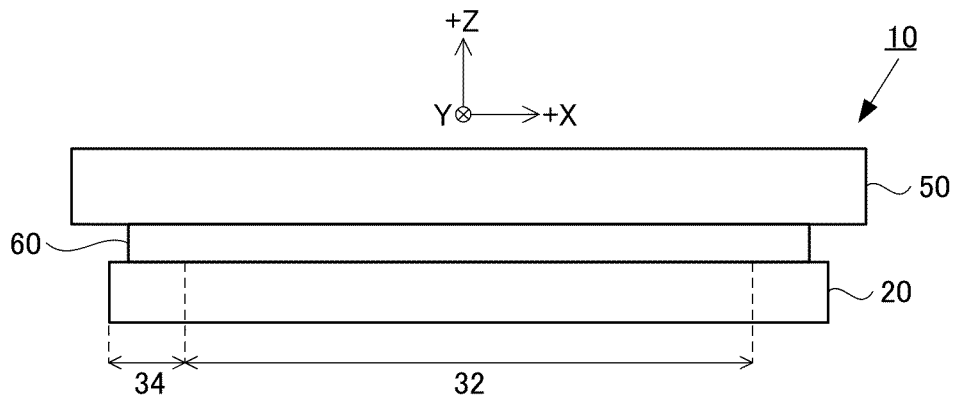
FIG. 1 is a side view illustrating a touch panel according to Embodiment 1.
Figure 2:
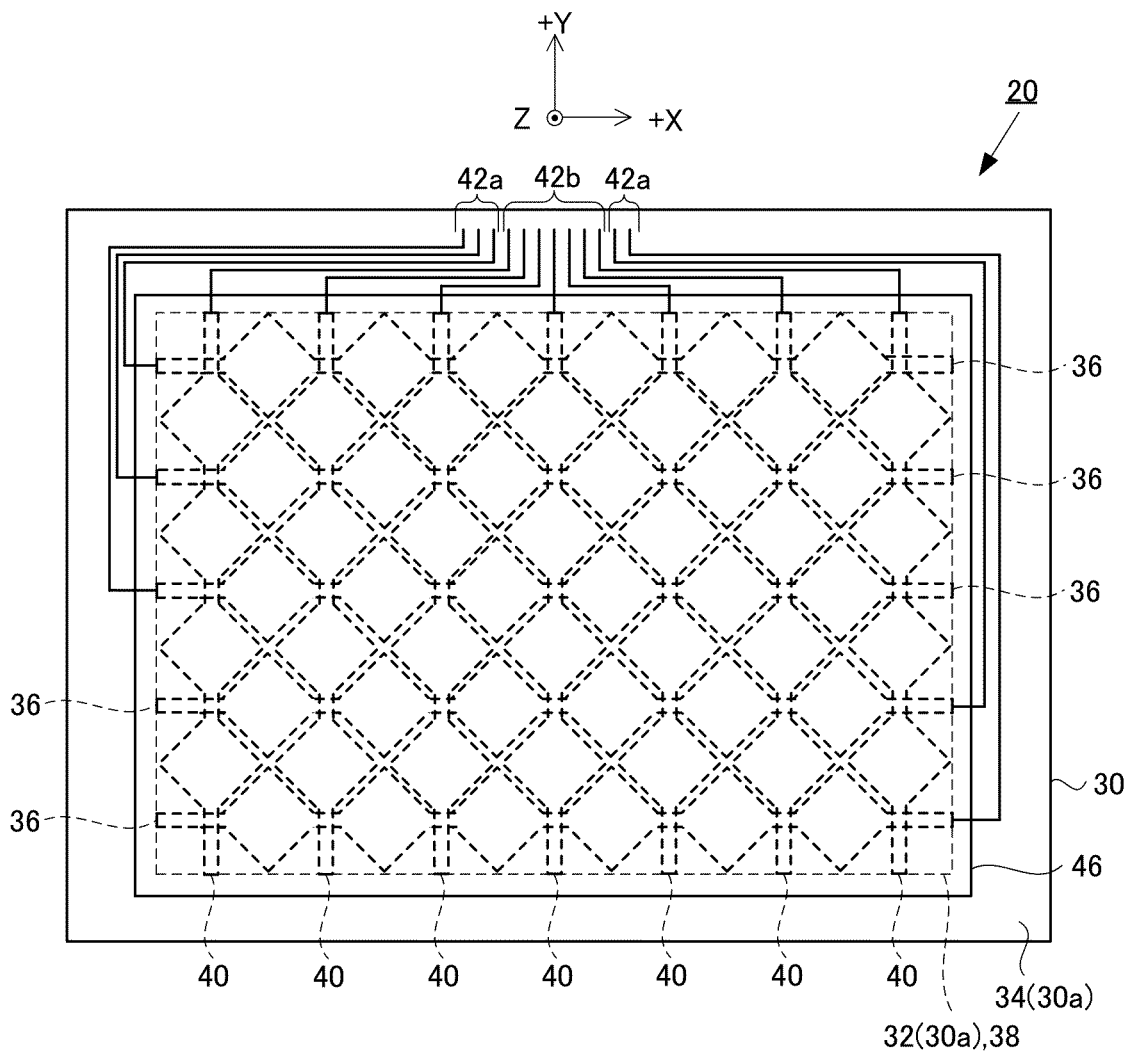
FIG. 2 is a plan view illustrating a first substrate according to Embodiment 1.

As illustrated in FIG. 1, the touch panel 10 includes a first substrate 20, a cover 50, and a first adhesive layer 60. As illustrated in FIG. 2, the first substrate 20 includes a base 30, a plurality of first electrodes 36, a plurality of second electrodes 40, an organic thin film 46, and the like. As illustrated in FIG. 1, the cover 50 is overlaid on the first substrate 20. The first adhesive layer 60 adheres the first substrate 20 to the cover 50. Note that, in the present description, to facilitate comprehension, in the touch panel 10 of FIG. 1, the longitudinal direction (the right direction on paper) is referred to as the "+X direction", the transverse direction (the depth direction on paper) is referred to as the "+Y direction", and the direction perpendicular to the +X direction and the +Y direction (the up direction on paper, the user side) is referred to as the "+Z direction."

As illustrated in FIG. 2, the first substrate 20 of the touch panel 10 includes the base 30, the plurality of first electrodes 36, an insulation layer 38, the plurality of second electrodes 40, a first wiring 42a, a second wiring 42b, and the organic thin film 46.

The base 30 of the first substrate 20 is formed of glass in a flat shape. The base 30 includes a first main surface 30a positioned on the +Z side. The base 30 includes a detection region 32, and a surrounding region 34 that surrounds the detection region 32. Note that, in the present embodiment, the term "glass" refers to glass that has silicon dioxide ($SiO_2$) as the main component. Additionally, in the present embodiment, nothing is formed on a second main surface 30b of the side of the base 30 opposite the first main surface 30a.

The first electrodes 36 of the first substrate 20 are each disposed in the detection region 32 of the first main surface 30a of the base 30, and are provided on the first main surface 30a of the base 30. The first electrodes 36 extend in a first direction (the X direction in the present embodiment). The first electrodes 36 are arranged at equal spacings in the Y direction. The first electrodes 36 have a pattern in which corners of a plurality of rectangles are connected in a row (a so-called "diamond pattern"). Each of the first electrodes 36 is connected to a non-illustrated controller via the first wiring 42a and a non-illustrated flexible printed circuit (FPC).

The insulation layer 38 of the first substrate 20 is provided on the first electrodes 36, and insulates the first electrodes 36 and the second electrodes 40 from each other. In one example, the insulation layer 38 is implemented as a silicon nitride thin film.

The second electrodes 40 of the first substrate 20 are each disposed in the detection region 32 of the first main surface 30a of the base 30, and are provided on the insulation layer 38 (the first main surface 30a of the base 30). The second electrodes 40 extend in a second direction (the Y direction in the present embodiment) that crosses the first direction. The second electrodes 40 are arranged at equal spacings in the X direction. As with the first electrodes 36, the second electrodes 40 have a pattern in which corners of a plurality of rectangles are connected in a row. Each of the second electrodes 40 is connected to the controller via the second wiring 42b and an FPC.

In one example, the first electrodes 36 and the second electrodes 40 are formed from indium tin oxide (ITO). When viewing the first substrate 20 from above, the first electrodes 36 and the second electrodes 40 cross at connections where the corners of the rectangles connect. The first electrodes 36 and the second electrodes 40 form capacitance with a target (for example, a finger, a hand, a pen, or the like of the user). The controller (a drive circuit and a detection circuit) measures the formed capacitance and, as a result, can detect the position contacted by the target (self-capacitance detection). Note that the detection method is not limited to self-capacitance detection, and mutual capacitance detection may be used.

The first wiring 42a of the first substrate 20 extends from an end of each of the first electrodes 36, and connects each of the first electrodes 36 to an FPC. The second wiring 42b of the first substrate 20 extends from an end of each of the second electrodes 40, and connects each of the second electrodes 40 to an FPC. The first wiring 42a and the second wiring 42b are disposed in the surrounding region 34 of the first main surface 30a of the base 30. In the following, the first wiring 42a and the second wiring 42b are sometimes referred to collectively as "wirings 42."

The organic thin film 46 of the first substrate 20 protects the first electrodes 36 and the second electrodes 40. The organic thin film 46 is formed from polyimide, an acrylic resin, or the like. The organic thin film 46 is formed on the first main surface 30a of the base 30, and covers the first electrodes 36 and the second electrodes 40. The organic thin film 46 may cover a portion of the surrounding region 34 of the first main surface 30a, or a portion of the first wiring 42a and the second wiring 42b. However, the organic thin film 46 does not cover the entirety of the surrounding region 34 of the first main surface 30a.

The cover 50 of the touch panel 10 is formed of glass in a flat shape. As illustrated in FIG. 1, the cover 50 is positioned on the +Z side of the first substrate 20, and is overlaid on the first substrate 20. The outer shape of the cover 50 is larger than the outer shape of the first substrate 20. The cover 50 is adhered to the first substrate 20 by the first adhesive layer 60. In the present embodiment, a main surface 50a of the cover 50 that opposes the first substrate 20 is adhered to the first substrate 20. Nothing is formed on the main surface 50a of the cover 50.

Figure 3:
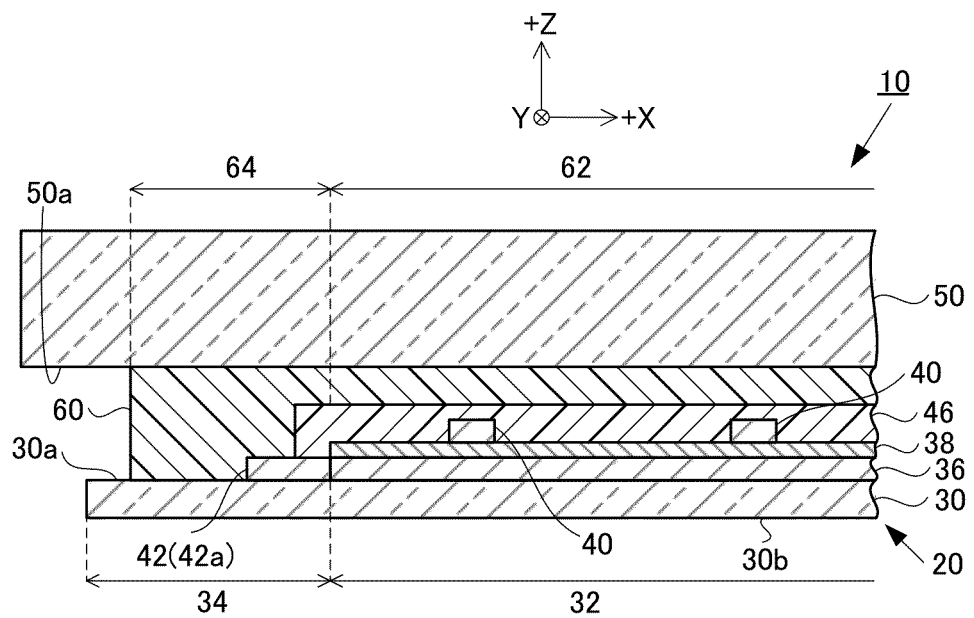
FIG. 3 is a cross-sectional view illustrating the touch panel according to Embodiment 1.

As illustrated in FIGS. 1 and 3, the first adhesive layer 60 adheres the first substrate 20 to the cover 50. The first adhesive layer 60 is formed from a polyvinyl acetal resin (for example polyvinyl butyral).

Specifically, in a region 62 corresponding to the detection region 32 of the base 30, the first adhesive layer 60 directly adheres the main surface 50a of the cover 50 to the organic thin film 46 formed in the detection region 32. Additionally, in a region 64 corresponding to the surrounding region 34 of the base 30, the first adhesive layer 60 directly adheres the main surface 50a of the cover 50 to the organic thin film 46 formed in the surrounding region 34, the main surface 50a of the cover 50 to the wirings 42 formed in the surrounding region 34, and the main surface 50a of the cover 50 to the surrounding region 34 of the first main surface 30a of the base 30.

The base 30 and the cover 50 are formed from glass and, as such, in the region 64 corresponding to the surrounding region 34 of the base 30, the first adhesive layer 60 directly adheres these glass components to each other, that is, directly adheres the surrounding region 34 of the first main surface 30a of the base 30 to the main surface 50a of the cover 50. The polyvinyl acetal resin forming the first adhesive layer 60 has high adhesion to glass and, as such, the first adhesive layer 60 can prevent the surrounding region 34 of the base 30, of which fragments are more likely to scatter broadly, from peeling from the first adhesive layer 60 at a time of collision of the vehicle. As a result, the safety of the touch panel 10 can be enhanced.

Meanwhile, in the region 62 corresponding to the detection region 32 of the first adhesive layer 60, the main surface 50a of the cover 50 is directly adhered to the organic thin film 46 formed in the detection region 32. Generally, the adhesion of polyvinyl acetal resin to the organic thin film 46 is less than the adhesion of the polyvinyl acetal resin to glass. However, the detection region 32 is surrounded by the surrounding region 34 and, as such, even if the organic thin film 46 formed in the detection region 32 of the base 30 peels from the first adhesive layer 60 and fragments thereof are formed from the detection region 32 of the base 30, the fragments are less likely to scatter broadly. Additionally, the organic thin film 46 covers the first electrodes 36 and the second electrodes 40 and, as such, can protect the first electrodes 36 and the second electrodes 40.

Furthermore, the first adhesive layer 60 adheres the entirety of the main surface 50a of the cover 50 that is formed from glass and, as such, the cover 50 can be firmly adhered.

Figure 4:
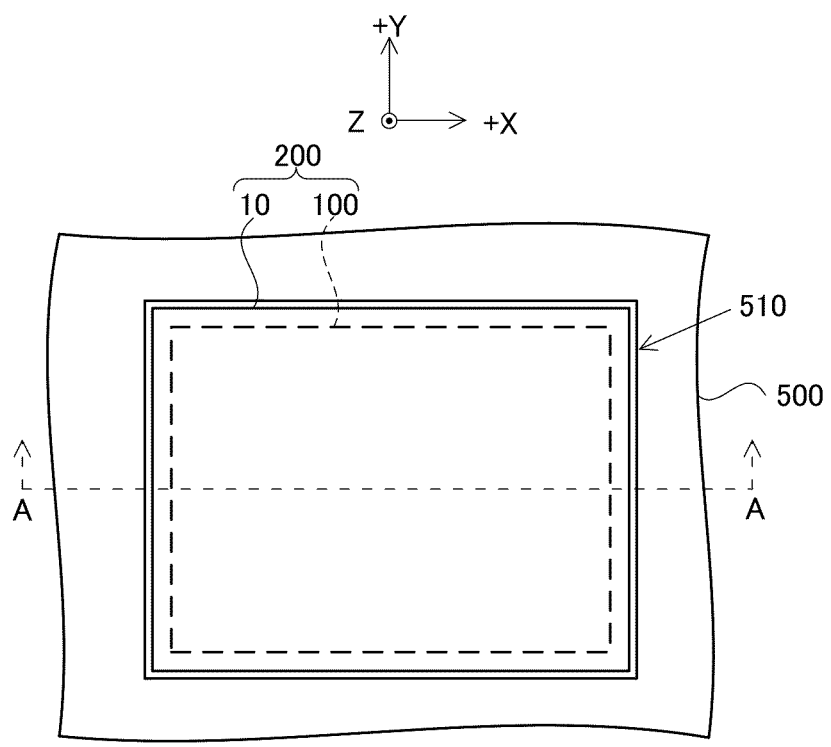
FIG. 4 is a plan view illustrating a display device according to Embodiment 1.
Figure 5:
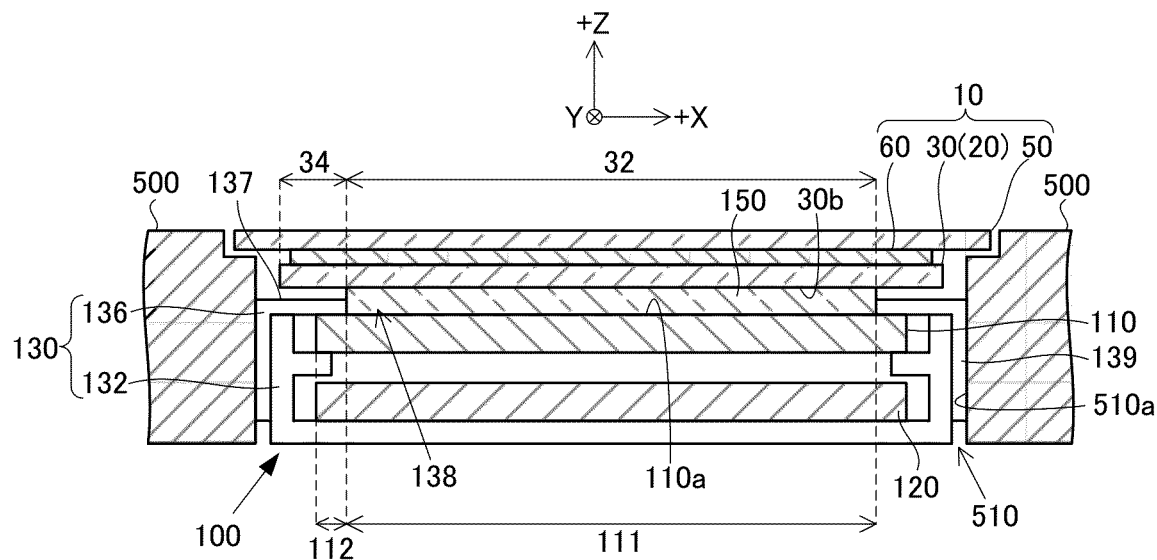
FIG. 5 is a cross-sectional view of the display device illustrated in FIG. 4, taken along line A-A.

Next, the display device 200 is described. As illustrated in FIGS. 4 and 5, the display device 200 is disposed on an open section 510 of an instrument panel 500 of the vehicle. In one example, the instrument panel 500 is formed from a resin. The display device 200 includes the touch panel 10 described above, a display 100, and an adhesive layer 150. Note that the configuration of the touch panel 10 is simplified in FIG. 5.

The display 100 of the display device 200 displays display elements (characters, images, and the like). As illustrated in FIG. 5, the display 100 is positioned on the −Z side of the touch panel 10. The display 100 is adhered to the touch panel 10 by the adhesive layer 150. The display 100 includes a liquid crystal display panel 110, a back light 120, and a housing 130.

In one example, the liquid crystal display panel 110 of the display 100 is implemented as a known transmissive horizontal electric field type liquid crystal display panel. The liquid crystal display panel 110 is active matrix driven by thin film transistors (TFT). The liquid crystal display panel 110 displays the display elements (characters, images, and the like) by modulating light from the back light 120. The liquid crystal display panel 110 includes a display region 111, and a periphery region 112 adjacent to the display region 111. The display region 111 is a region in which pixels are disposed in a matrix, and is capable of displaying the display elements. The display region 111 corresponds to the detection region 32 of the base 30 (the touch panel 10). The periphery region 112 is a region in which wirings, drive circuits, and the like are disposed.

Figure 6:
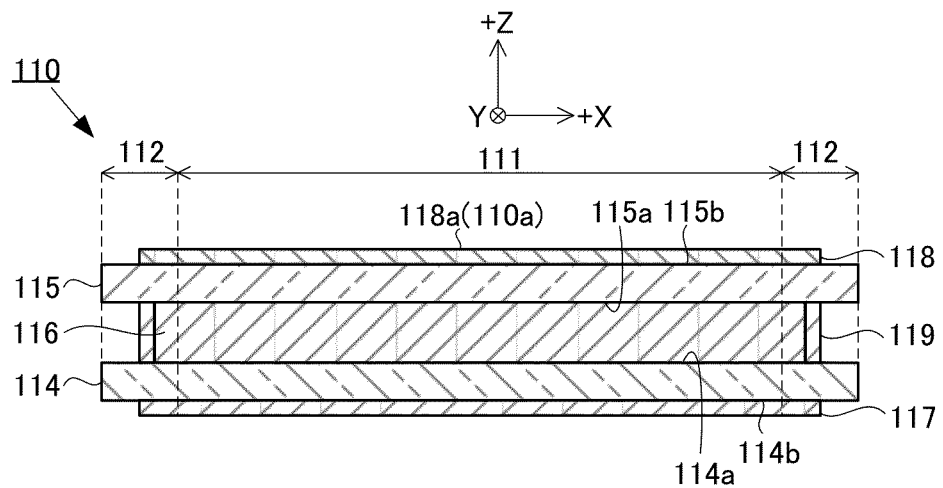
FIG. 6 is a cross-sectional view illustrating a liquid crystal display panel according to Embodiment 1.

As illustrated in FIG. 6, the liquid crystal display panel 110 includes a TFT substrate 114, a counter substrate 115, a liquid crystal 116, a first polarizing plate 117, and a second polarizing plate 118. The TFT substrate 114 and the counter substrate 115 sandwich the liquid crystal 116. The first polarizing plate 117 is provided on the TFT substrate 114. The second polarizing plate 118 is provided on the counter substrate 115.

In one example, the TFT substrate 114 is implemented as a glass substrate. The TFT substrate 114 is positioned on the −Z side. TFTs for selecting the pixels, common electrodes, pixel electrodes, a drive circuit, an alignment film for aligning the liquid crystal 116, and the like (all not illustrated in the drawings) are provided on a main surface 114a on the liquid crystal 116 side of the TFT substrate 114. The first polarizing plate 117 is provided on a main surface 114b on the side opposite the main surface 114a of the TFT substrate 114.

The counter substrate 115 is positioned on the +Z side, and opposes the TFT substrate 114. The counter substrate 115 is adhered to the TFT substrate 114 by a seal material 119. In one example, the counter substrate 115 is implemented as a glass substrate. A color filter, a black matrix, an alignment film for aligning the liquid crystal 116, and the like (all not illustrated in the drawings) are provided on a main surface 115a on the liquid crystal 116 side of the counter substrate 115. The second polarizing plate 118 is provided on a main surface 115b on the side opposite the main surface 115a of the counter substrate 115.

The liquid crystal 116 is sandwiched by the TFT substrate 114 and the counter substrate 115. In one example, the liquid crystal 116 is implemented as a positive nematic liquid crystal. The liquid crystal 116 is initially aligned, by the alignment film, in a direction parallel to the main surface 114a of the TFT substrate 114. Additionally, the liquid crystal 116 rotates in a plane parallel to the main surface 114a of the TFT substrate 114 due to voltage being applied.

The first polarizing plate 117 is provided on the main surface 114b of the TFT substrate 114. The second polarizing plate 118 is provided on the main surface 115b of the counter substrate 115. One transmittance axis of the transmittance axis of the first polarizing plate 117 and the transmittance axis of the second polarizing plate 118 is arranged parallel to the initial alignment direction of the liquid crystal 116, and the transmission axis of the first polarizing plate 117 and the transmittance axis of the second polarizing plate 118 are orthogonal to each other. In the present embodiment, a main surface 118a on the +Z side of the second polarizing plate 118 corresponds to a display surface 110a of the liquid crystal display panel 110.

As illustrated in FIG. 5, the back light 120 of the display 100 is disposed on a back surface side (the −Z side) of the liquid crystal display panel 110. The back light 120 is the light source of the liquid crystal display panel 110, and emits white light on the liquid crystal display panel 110. The back light 120 includes a white light emitting diode (LED) element, a reflective sheet, a diffusion sheet, a lighting circuit, and the like (all not illustrated in the drawings).

The housing 130 of the display 100 accommodates the liquid crystal display panel 110 and the back light 120. The housing 130 includes a chassis 132 and a bezel 136.

The chassis 132 has a box-like shape, and is formed from a resin or a metal. The chassis 132 accommodates, on an inner side thereof, the liquid crystal display panel 110 and the back light 120.

The bezel 136 has a box-like shape. An opening 138 is provided on a bottom 137 of the bezel 136. In one example, the bezel 136 is formed from a metal. The bezel 136 covers the chassis 132 with the bottom 137 facing the +Z side. The bezel 136 protects the periphery region 112 of the liquid crystal display panel 110. The display region 111 of the liquid crystal display panel 110 (the display surface 110a of the liquid crystal display panel 110) is exposed through the opening 138. In the present embodiment, a side plate 139 of the bezel 136 is fixed to an inner wall 510a of the open section 510 of the instrument panel 500 by a non-illustrated screw. As a result, the display device 200 is held to the open section 510 of the instrument panel 500.

The adhesive layer 150 of the display device 200 adheres the touch panel 10 to the display 100. Specifically, as illustrated in FIG. 5, the adhesive layer 150 adheres the display region 111 (the display surface 110a) of the liquid crystal display panel 110, exposed through the opening 138 of the bezel 136, to the detection region 32 of the second main surface 30b, of the base 30, on the side opposite the first main surface 30a. With the display device 200, the detection region 32 of the second main surface 30b of the base 30 is adhered to the display region 111 of the liquid crystal display panel 110 and, as such, it is less likely that fragments will form from the detection region 32 of the base 30, even if the organic thin film 46 formed in the detection region 32 of the base 30 peels from the first adhesive layer 60 at a time of collision of the vehicle.

In one example, the adhesive layer 150 is formed from an optical clear adhesive (OCA).

As described above, with the touch panel 10, the first adhesive layer 60 directly adheres the surrounding region 34 of the first main surface 30a of the base 30, that is formed from glass, to the main surface 50a of the cover 50, that is formed from glass. The polyvinyl acetal resin forming the first adhesive layer 60 has high adhesion to glass and, as such, the first adhesive layer 60 can prevent the surrounding region 34 of the base 30, of which fragments are more likely to scatter broadly, from peeling from the first adhesive layer 60 at a time of collision of the vehicle and, thus, the safety of the touch panel 10 can be enhanced. Furthermore, with the touch panel 10, the first adhesive layer 60 adheres the entirety of the main surface 50a of the cover 50 and, as such, the cover 50 can be firmly adhered.

With the display device 200 including the touch panel 10 as well, as with the touch panel 10, the surrounding region 34 of the base 30, of which fragments are more likely to scatter broadly, can be prevented from peeling from the first adhesive layer 60 at a time of collision of the vehicle and, thus, safety can be enhanced. Furthermore, with the display device 200, the display region 111 of the liquid crystal display panel 110 and the detection region 32 of the second main surface 30b of the base 30 are adhered to each other by the adhesive layer 150 and, as such, fragments can be prevented from forming from the detection region 32 of the base 30.

Embodiment 2

In Embodiment 1, the second electrodes 40 are provided on the first main surface 30a of the base 30. A configuration is possible in which the second electrodes 40 are provided on the second main surface 30b of the base 30. As with the touch panel 10 of Embodiment 1, the touch panel 10 of the present embodiment includes a first substrate 20, a cover 50, and a first adhesive layer 60. The configurations of the cover 50 and the first adhesive layer 60 of the touch panel 10 of the present embodiment are the same as those of the cover 50 and the first adhesive layer 60 of Embodiment 1 and, as such, the first substrate 20 of the present embodiment is described. Note that, as with the touch panel 10 of Embodiment 1, the touch panel 10 of the present embodiment, a display 100, and an adhesive layer 150 constitute a display device 200.

Figure 7:
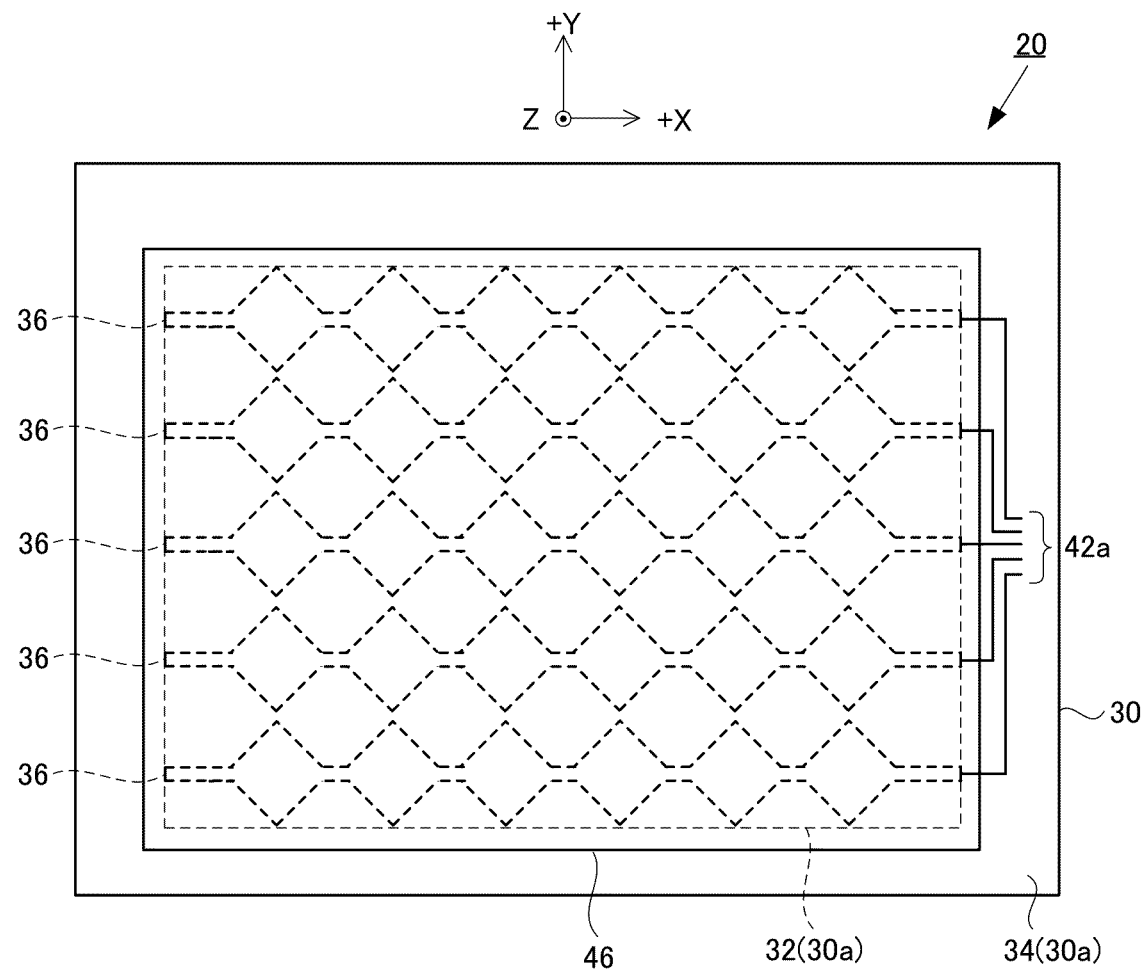
FIG. 7 is a plan view illustrating a first substrate according to Embodiment 2.
Figure 8:
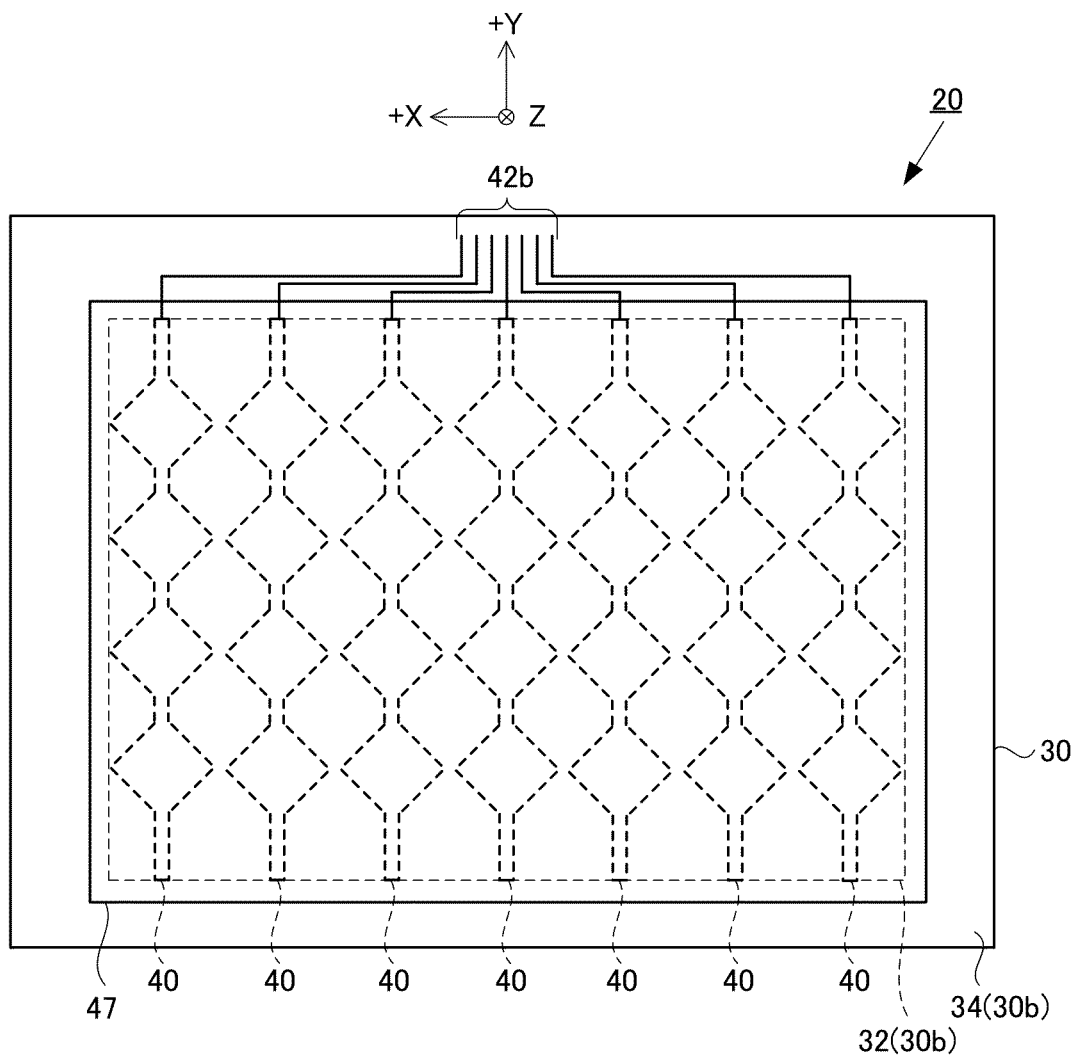
FIG. 8 is a plan view illustrating the first substrate according to Embodiment 2.

As illustrated in FIGS. 7 and 8, the first substrate 20 of the present embodiment includes a base 30, first electrodes 36, second electrodes 40, a first wiring 42a, a second wiring 42b, and organic thin films 46, 47. The configuration of the base 30 of the present embodiment is the same as that of the base 30 of Embodiment 1.

As with the first electrodes 36 of Embodiment 1, the first electrodes 36 of the present embodiment are each disposed in the detection region 32 of the first main surface 30a of the base 30, and are provided on the first main surface 30a of the base 30 (FIG. 7). The other configurations of the first electrodes 36 of the present embodiment are the same as the first electrodes 36 of Embodiment 1.

As with the first wiring 42a of Embodiment 1, the first wiring 42a of the present embodiment extends from an end of each of the first electrodes 36, and connects each of the first electrodes 36 to an FPC. Additionally, the first wiring 42a of the present embodiment is disposed in the surrounding region 34 of the first main surface 30a of the base 30.

The organic thin film 46 of present embodiment protects the first electrodes 36. As illustrated in FIG. 7, the organic thin film 46 of the present embodiment is formed on the first main surface 30a of the base 30, and covers the first electrodes 36. As with the organic thin film 46 of Embodiment 1, the organic thin film 46 of the present embodiment may cover a portion of the surrounding region 34 of the first main surface 30a, or a portion of the first wiring 42a. However, the organic thin film 46 of the present embodiment does not cover the entirety of the surrounding region 34 of the first main surface 30a.

As illustrated in FIG. 8, the second electrodes 40 of the present embodiment are disposed in the detection region 32 of the second main surface 30b of the base 30, and are provided on the second main surface 30b of the base 30. Additionally, as with the second electrodes 40 of Embodiment 1, the second electrodes 40 of the present embodiment extend in a second direction (the Y direction in the present embodiment) that crosses the first direction, and are arranged at equal spacings in the X direction. The other configurations of the second electrodes 40 of the present embodiment are the same as the second electrodes 40 of Embodiment 1. Moreover, when viewing the first substrate 20 from above, the first electrodes 36 and the second electrodes 40 of the present embodiment cross at connections where the corners of the rectangles connect.

As with the second wiring 42b of Embodiment 1, the second wiring 42b of the present embodiment extends from an end of each of the second electrodes 40, and connects each of the second electrodes 40 to an FPC. The second wiring 42b of the present embodiment is disposed in the surrounding region 34 of the second main surface 30b of the base 30.

An organic thin film 47 protects the second electrodes 40. The organic thin film 47 is formed on the second main surface 30b of the base 30, and covers the second electrodes 40. As with the organic thin film 46, the organic thin film 47 is formed from polyimide, an acrylic resin, or the like. The organic thin film 47 may cover the surrounding region 34 of the second main surface 30b, or the second wiring 42b.

Figure 9:
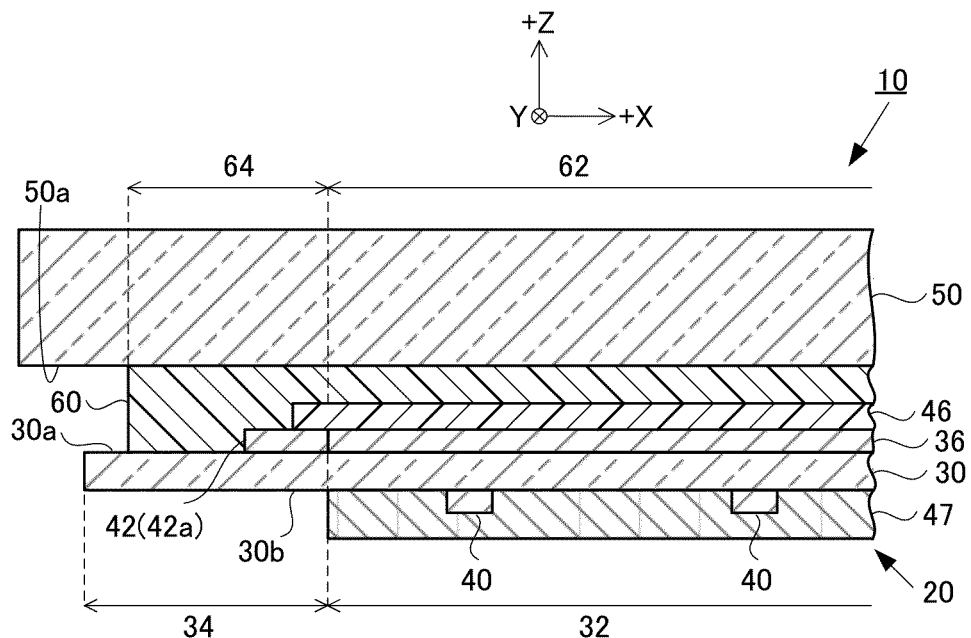
FIG. 9 is a cross-sectional view illustrating a touch panel according to Embodiment 2.

As illustrated in FIG. 9, in a region 64 corresponding to the surrounding region 34 of the base 30, the first adhesive layer 60 that is formed from a polyvinyl acetal resin directly adheres the main surface 50a of the cover 50 to the organic thin film 46 formed in the surrounding region 34, the main surface 50a of the cover 50 to the wirings 42 formed in the surrounding region 34, and the main surface 50a of the cover 50 to the surrounding region 34 of the first main surface 30a of the base 30. Accordingly, as in Embodiment 1, the surrounding region 34 of the base 30, of which fragments are more likely to scatter broadly, can be prevented from peeling from the first adhesive layer 60 at a time of collision of the vehicle and, thus the safety of the touch panel 10 can be enhanced. Furthermore, the first adhesive layer 60 adheres the entirety of the main surface 50a of the cover 50 and, as such, the cover 50 can be firmly adhered.

With the display device 200 including the touch panel 10 of present embodiment, the surrounding region 34 of the base 30, of which fragments are more likely to scatter broadly, can be prevented from peeling from the first adhesive layer 60 at a time of collision of the vehicle and, thus safety can be enhanced. Additionally, as with the display device 200 of Embodiment 1, with the display device 200 including the touch panel 10 of the present embodiment, fragments can be prevented from forming from the detection region 32 of the base 30.

Embodiment 3

In Embodiment 1 and Embodiment 2, nothing is formed on the main surface 50a that opposes the first substrate 20 of the cover 50. However, a configuration is possible in which, for example, a decoration 52 is formed on the main surface 50a of the cover 50. As with the touch panel 10 of Embodiment 1, the touch panel 10 of the present embodiment includes a first substrate 20, a cover 50, and a first adhesive layer 60. The configuration of the first substrate 20 the present embodiment is the same as that of the first substrate 20 of Embodiment 1 and, as such, the cover 50 and the first adhesive layer 60 of the present embodiment are described.

Figure 10:
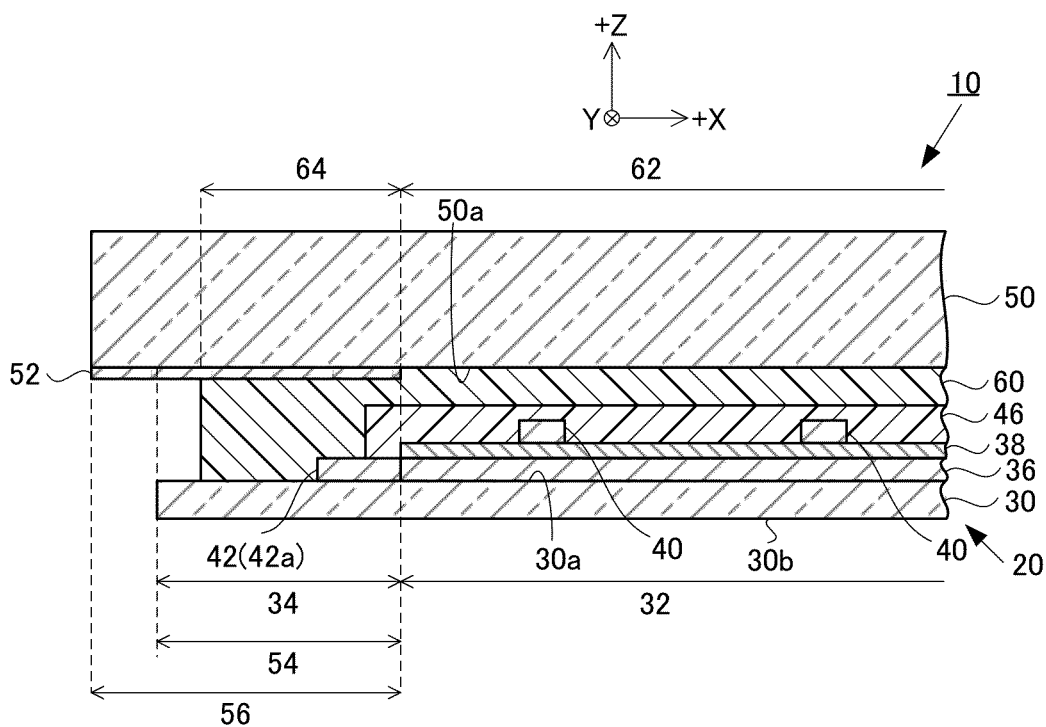
FIG. 10 is a cross-sectional view illustrating a touch panel according to Embodiment 3.

As illustrated in FIG. 10, the cover 50 of the present embodiment includes the decoration 52 in a periphery 56, of the main surface 50a opposing the first substrate 20, including a region 54 corresponding to the surrounding region 34 of the base 30. The other configurations of the cover 50 of the present embodiment are the same as the configurations of the cover 50 of Embodiment 1.

The decoration 52 is a layer that has a desired color, a desired pattern such as a wood grain, a geometric pattern, or the like, or the like. The decoration 52 hides a member positioned on the back surface side (the −Z side) of the cover 50. When the display device 200 includes the touch panel 10 and the display 100, the decoration 52 suppresses light leakage from the display 100. In one example, the decoration 52 is provided in the periphery 56 of the main surface 50a by printing. The decoration 52 is formed from a polyester-based ink, an epoxy-based ink, or the like that includes a colorant of a desired color.

As with the first adhesive layer 60 of Embodiment 1, the first adhesive layer 60 of the present embodiment adheres the first substrate 20 to the cover 50. The first adhesive layer 60 of the present embodiment is formed from a polyvinyl acetal resin (for example, polyvinyl butyral).

As in Embodiment 1, in a region 62 corresponding to the detection region 32 of the base 30, the first adhesive layer 60 of the present embodiment directly adheres the main surface 50a of the cover 50 to the organic thin film 46 formed in the detection region 32. In a region 64 corresponding to the surrounding region 34 of the base 30, the first adhesive layer 60 of the present embodiment directly adheres the decoration 52 of the cover 50 to the organic thin film 46 formed in the surrounding region 34, the decoration 52 of the cover 50 to the wirings 42 formed in the surrounding region 34, and the decoration 52 of the cover 50 to the surrounding region 34 of the first main surface 30a of the base 30.

In the region 64 corresponding to the surrounding region 34 of the base 30, the first adhesive layer 60 directly adheres the surrounding region 34 of the first main surface 30a of base 30 to the decoration 52 of the cover 50. The polyvinyl acetal resin forming the first adhesive layer 60 has high adhesion to the glass forming the surrounding region 34 of the first main surface 30a of the base 30 and, as such, the first adhesive layer 60 can prevent the surrounding region 34 of the base 30, of which fragments are more likely to scatter broadly, from peeling from the first adhesive layer 60 at a time of collision of the vehicle. As a result, the safety of the touch panel 10 can be enhanced.

In the region 62 corresponding to the detection region 32 of the base 30, which is wider than the periphery 56 of the cover 50, the first adhesive layer 60 directly adheres the main surface 50a of the cover 50 that is formed from glass and, as such, the cover 50 can be firmly adhered.

Figure 11:
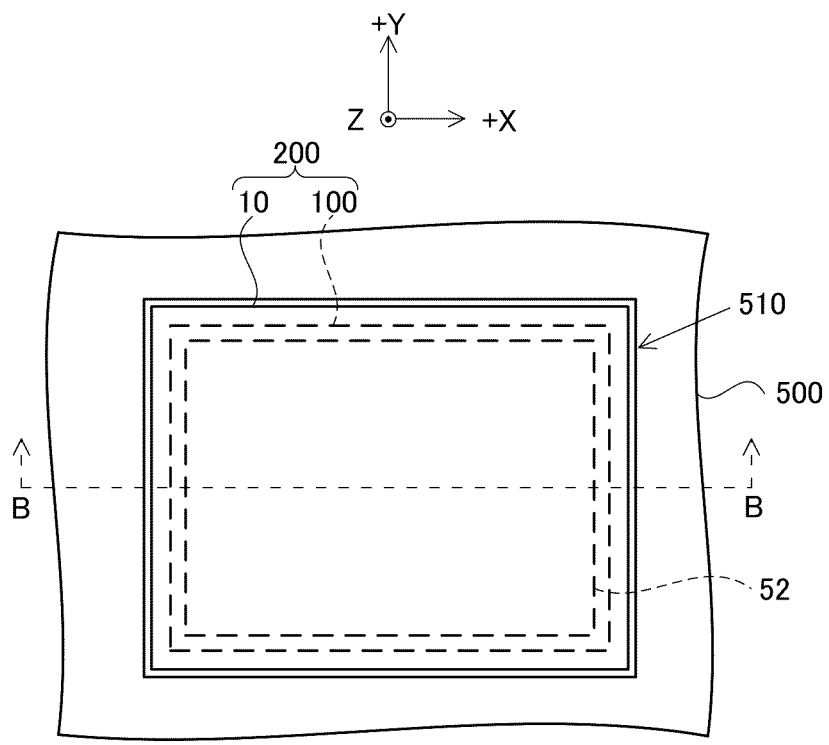
FIG. 11 is a plan view illustrating a display device according to Embodiment 3.
Figure 12:
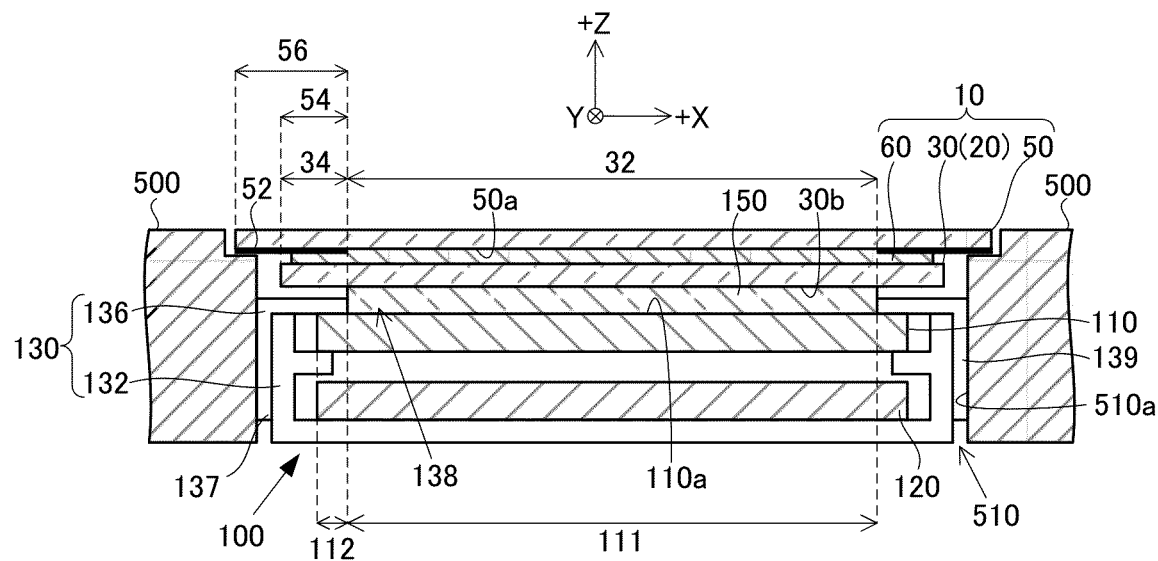
FIG. 12 is a cross-sectional view of the display device illustrated in FIG. 11, taken along line B-B.

As with the touch panel 10 of Embodiment 1, the touch panel 10 of the present embodiment, a display 100, and an adhesive layer 150 constitute the display device 200. As illustrated in FIGS. 11 and 12, the display device 200 of the present embodiment is disposed in an open section 510 of an instrument panel 500. A sense of integration of the display device 200 and the instrument panel 500 can be enhanced by matching the color, the pattern, and the like of the decoration 52 of the cover 50 to the color, texture, and the like of the instrument panel 500. Note that the configuration of the touch panel 10 of present embodiment is simplified in FIG. 12.

As described above, with the touch panel 10 of the present embodiment, the surrounding region 34 of the base 30, of which fragments are more likely to scatter broadly, can be prevented from peeling from the first adhesive layer 60 at a time of collision of the vehicle and, thus the safety of the touch panel 10 can be enhanced. Furthermore, with the touch panel 10 of the present embodiment, the cover 50 can be firmly adhered.

With the display device 200 of present embodiment as well, the surrounding region 34 of the base 30, of which fragments are more likely to scatter broadly, can be prevented from peeling from the first adhesive layer 60 at a time of collision of the vehicle and, thus, safety can be enhanced. Furthermore, the sense of integration of the display device 200 and a target can be enhanced by matching the color, the pattern, and the like of the decoration 52 of the cover 50 to the color, texture, and the like of the target on which the display device 200 is to be provided.

Embodiment 4

In Embodiments 1 to 3, the entirety of the detection region 32 of the first main surface 30a of the base 30 is covered by the organic thin film 46. A configuration is possible in which the base 30 includes, in the detection region 32, an exposure region 35 in which the first main surface 30a is exposed through the organic thin film 46. The first adhesive layer 60 directly adheres the cover 50 to the exposure region 35.

As with the touch panel 10 of Embodiment 1, the touch panel 10 of the present embodiment includes a first substrate 20, a cover 50, and a first adhesive layer 60. Note that, as with the touch panel 10 of Embodiment 1, the touch panel 10 of the present embodiment, a display 100, and an adhesive layer 150 constitute a display device 200.

As with the first substrate 20 of Embodiment 1, the first substrate 20 of the present embodiment includes the base 30, a plurality of first electrodes 36, an insulation layer 38, a plurality of second electrodes 40, a first wiring 42a, a second wiring 42b, and an organic thin film 46. The configurations of the first wiring 42a and the second wiring 42b are the same as in Embodiment 1 and, as such, the base 30, the first electrodes 36, the insulation layer 38, the second electrodes 40, and the organic thin film 46 are described.

Figure 13:
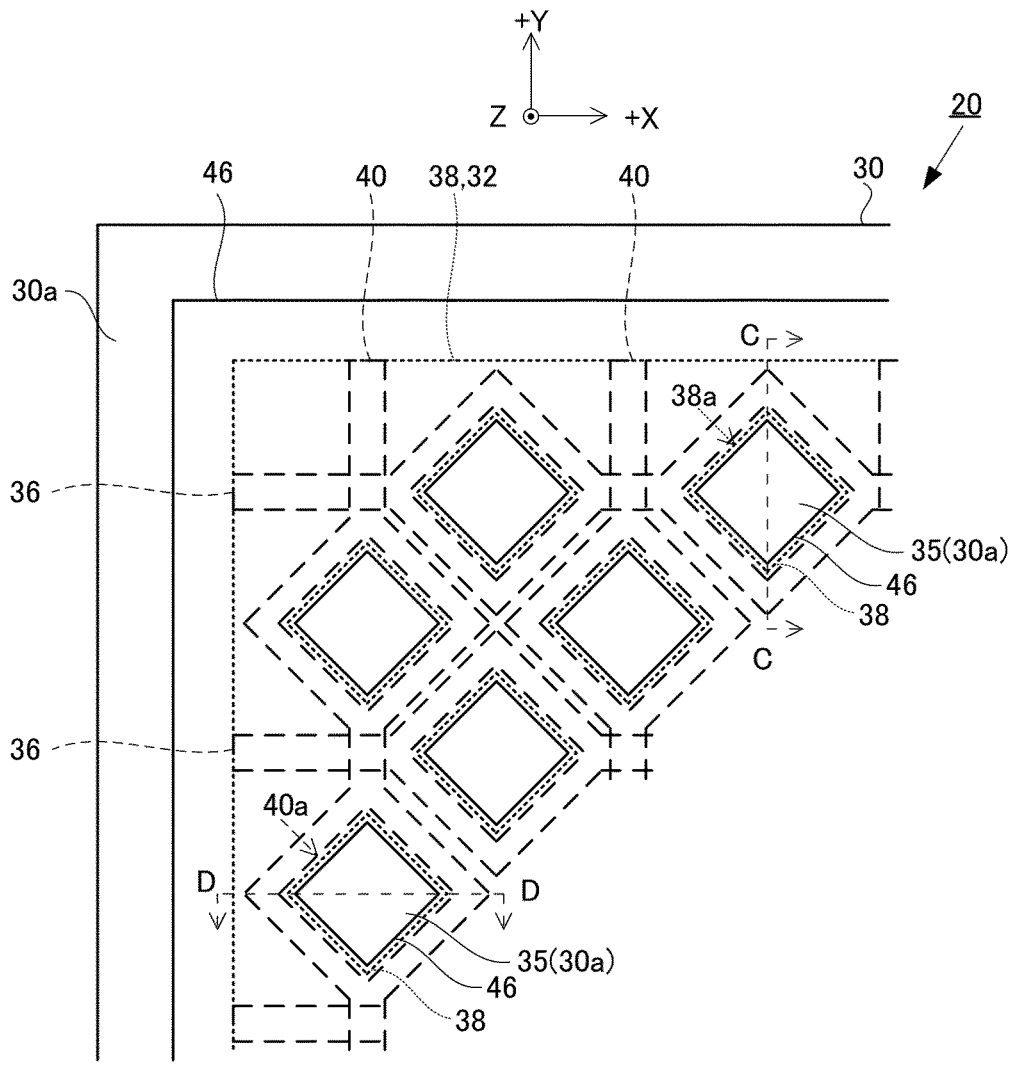
FIG. 13 is a plan view illustrating a portion of a first substrate according to Embodiment 4.
Figure 14:
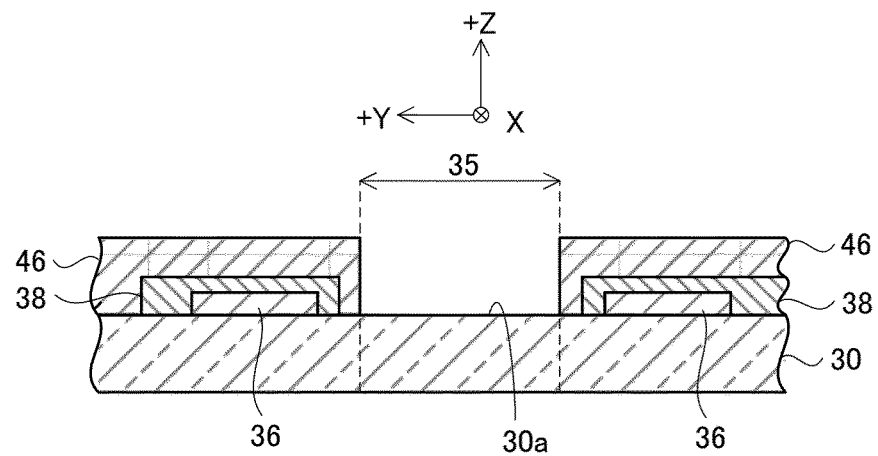
FIG. 14 is a cross-sectional view illustrating the first substrate illustrated in FIG. 13, taken along line C-C.
Figure 15:
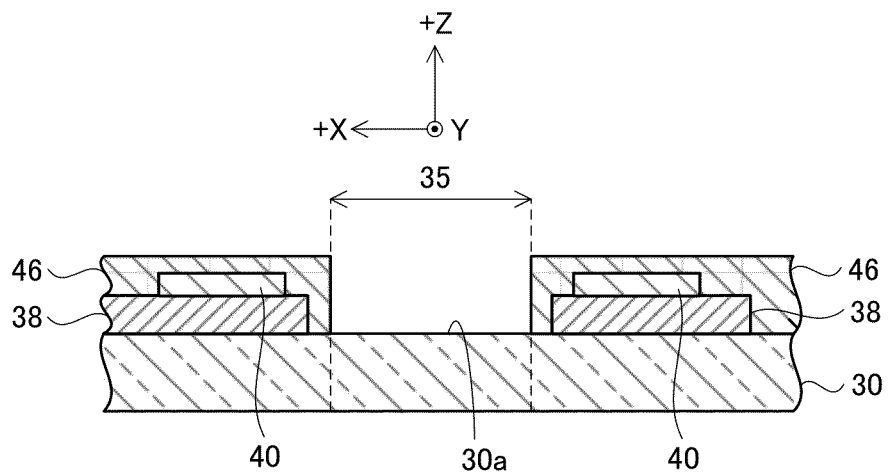
FIG. 15 is a cross-sectional view illustrating the first substrate depicted in FIG. 13, taken along line D-D.

As in Embodiment 1, the base 30 of the present embodiment is formed of glass in a flat shape, and includes a first main surface 30a. Additionally, the base 30 of the present embodiment includes a detection region 32, and a surrounding region 34 that surrounds the detection region 32. As illustrated in FIGS. 13 to 15, in the present embodiment, the base 30 includes, in the detection region 32, an exposure region 35 in which the first main surface 30a is exposed through the organic thin film 46. Details of the exposure region 35 are described later. Note that the wirings 42 are omitted from FIG. 13.

Figure 16:
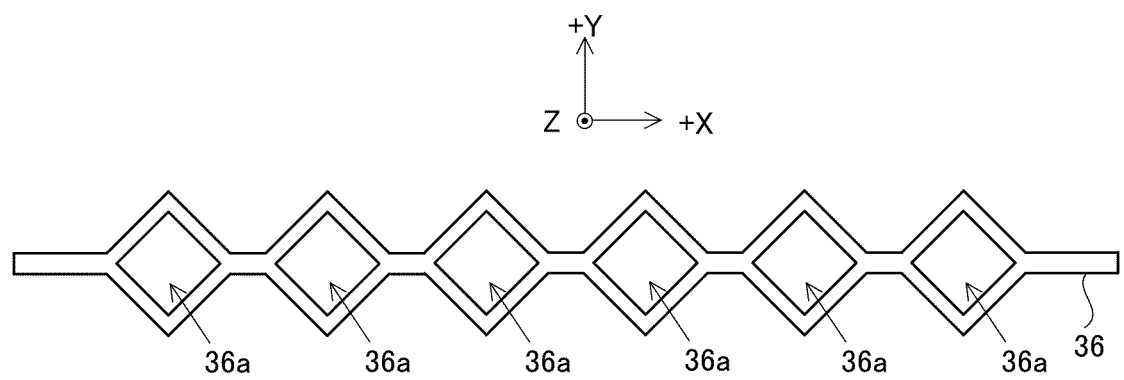
FIG. 16 is a schematic drawing illustrating a first electrode according to Embodiment 4.

As in Embodiment 1, the first electrodes 36 of the present embodiment are each disposed in the detection region 32 of the first main surface 30a of the base 30, and are provided on the first main surface 30a of the base 30. The first electrodes 36 of the present embodiment also extend in a first direction (the X direction), and are arranged at equal spacings in the Y direction. As illustrated in FIG. 16, the first electrodes 36 of the present embodiment have a pattern in which corners of a rectangles, each having an opening 36a in a center portion thereof, are connected in a row. The first main surface 30a of the base 30 is exposed through the opening 36a.

Figure 17:
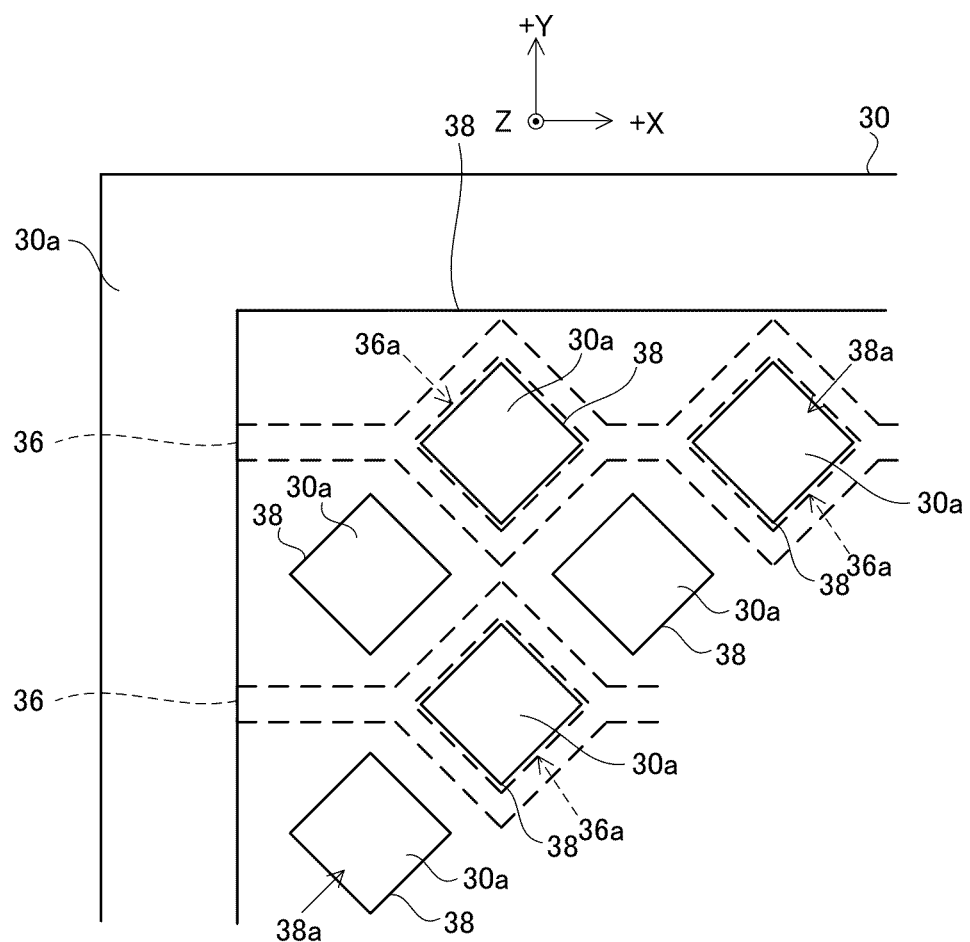
FIG. 17 is a plan view illustrating an insulation layer according to Embodiment 4.

The insulation layer 38 of the present embodiment is provided on the first electrodes 36 and the first main surface 30a of the base 30, and insulates the first electrodes 36 and the second electrodes 40 from each other. As illustrated in FIG. 17, the insulation layer 38 of the present embodiment is patterned in a shape having an opening 38a so that the first main surface 30a of the base 30, exposed through the opening 36a of the each of the first electrodes 36, is exposed and, also, the first main surface 30a of the base 30 is exposed through an opening 40a of each of the second electrodes 40, described later.

Figure 18:
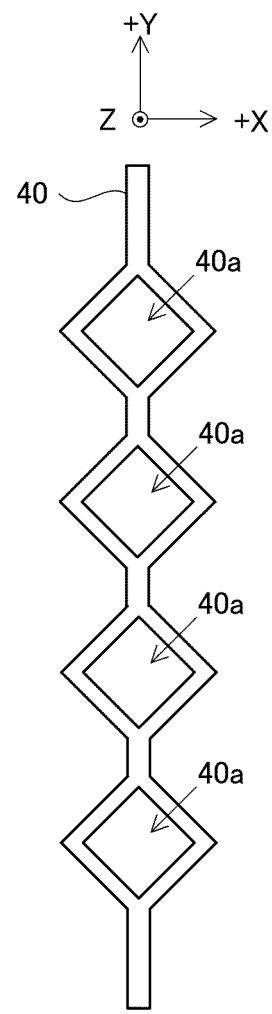
FIG. 18 is a schematic drawing illustrating a second electrode according to Embodiment 4.
Figure 19:
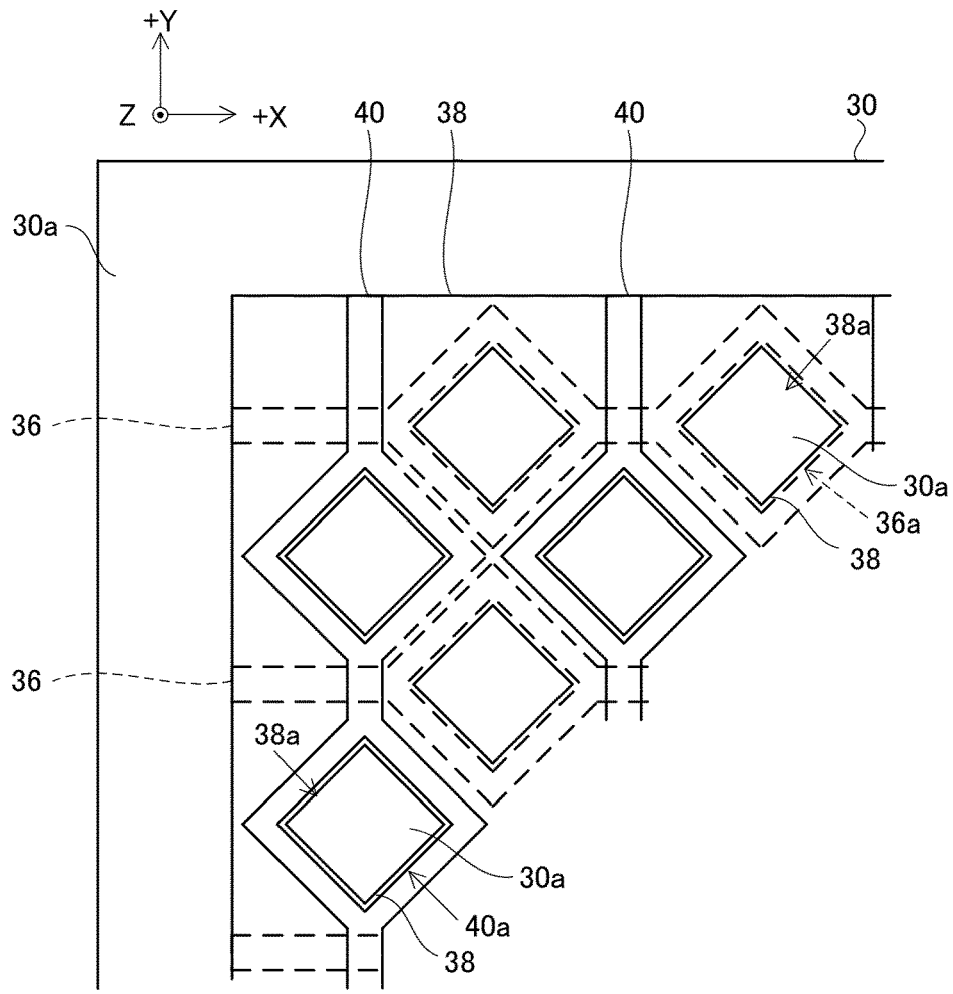
FIG. 19 is a plan view illustrating the second electrode according to Embodiment 4.

As in Embodiment 1, the second electrodes 40 of the present embodiment are disposed in the detection region 32 of the first main surface 30a of the base 30, and are provided on the insulation layer 38. The second electrodes 40 of the present embodiment also extend in a second direction (the Y direction) that crosses the first direction, and are arranged at equal spacings in the X direction. As illustrated in FIG. 18, the second electrodes 40 of the present embodiment have a pattern in which corners of a rectangles, each having an opening 40a in a center portion thereof, are connected in a row. As illustrated in FIG. 19, the first main surface 30a of the base 30, exposed through the opening 38a of the insulation layer 38, is exposed through the opening 40a.

As in Embodiment 1, the first electrodes 36 and the second electrodes 40 of the present embodiment form capacitance with a target. The controller measures the formed capacitance and, as a result, can detect the contact position of the target.

The organic thin film 46 of present embodiment protects the first electrodes 36 and the second electrodes 40. As in Embodiment 1, the organic thin film 46 of the present embodiment covers the first electrodes 36 and the second electrodes 40. The organic thin film 46 of the present embodiment may cover a portion of the surrounding region 34 of the first main surface 30a, or a portion of the first wiring 42a and the second wiring 42b. However, as in Embodiment 1, the organic thin film 46 of the present embodiment does not cover the entirety of the surrounding region 34 of the first main surface 30a.

Additionally, as illustrated in FIG. 13, the organic thin film 46 of the present embodiment is patterned such that the first main surface 30a (portion where the first electrodes 36 are disposed) of the base 30, exposed through the opening 38a of the insulation layer 38, and the first main surface 30a (portion where the second electrodes 40 are disposed) of the base 30, exposed through the opening 40a of each of the second electrodes 40, are exposed. As a result, as illustrated in FIGS. 13 to 15, the exposure region 35 in which the first main surface 30a is exposed is formed in the detection region 32 without anything being formed on the first main surface 30a.

The configuration of the cover 50 of the present embodiment is the same as the configuration of the cover 50 of Embodiment 1.

As in Embodiment 1, the first adhesive layer 60 of the present embodiment adheres the first substrate 20 to the cover 50. The first adhesive layer 60 is formed from a polyvinyl acetal resin (for example polyvinyl butyral).

As in Embodiment 1, in a region 64 corresponding to the surrounding region 34 of the base 30, the first adhesive layer 60 directly adheres the main surface 50a of the cover 50 to the organic thin film 46 formed in the surrounding region 34, the main surface 50a of the cover 50 to the wirings 42 formed in the surrounding region 34, and the main surface 50a of the cover 50 to the surrounding region 34 of the first main surface 30a of the base 30. Accordingly, as in Embodiment 1, the first adhesive layer 60 can prevent the surrounding region 34 of the base 30 from peeling from first adhesive layer 60. As a result, the safety of the touch panel 10 can be enhanced.

Figure 20:
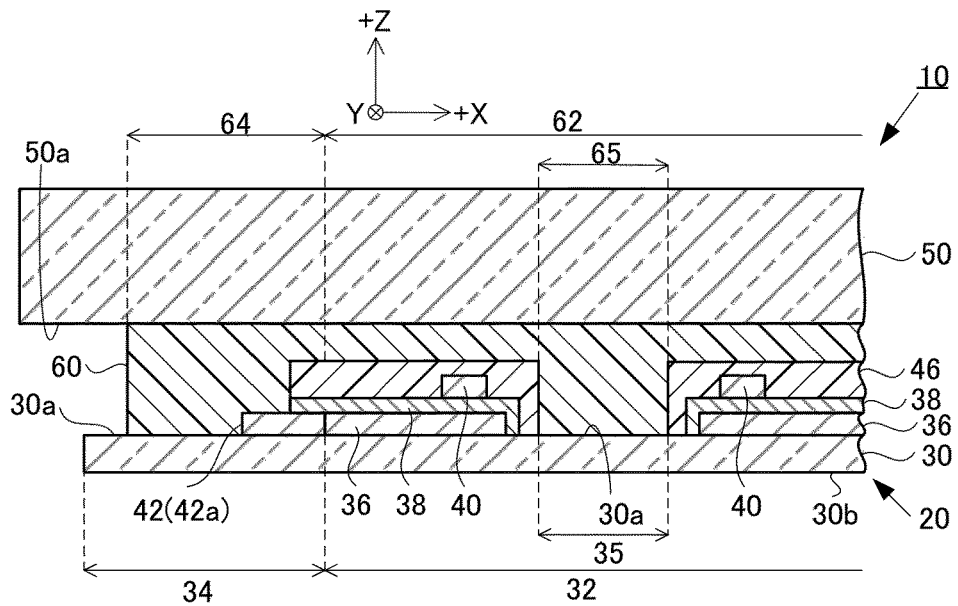
FIG. 20 is a cross-sectional view illustrating a touch panel according to Embodiment 4.

As illustrated in FIG. 20, in a region 62 corresponding to the detection region 32 of the base 30, the first adhesive layer 60 directly adheres the main surface 50a of the cover 50 to the organic thin film 46 formed in the detection region 32, and the main surface 50a of the cover 50 to the first main surface 30a of the base 30 exposed in the exposure region 35. Accordingly, the first adhesive layer 60 directly adheres the glass members to each other also in the region 62 corresponding to the detection region 32 of the base 30 (region 65 corresponding to the exposure region 35 of the base 30). As a result, the first adhesive layer 60 can prevent the detection region 32 (the exposure region 35) of the base 30 from peeling from first adhesive layer 60. Additionally, the first adhesive layer 60 can more firmly adhere the first substrate 20 to the cover 50.

As described above, as in Embodiment 1, the first adhesive layer 60 of the present embodiment directly adheres the surrounding region 34 of the first main surface 30a of the base 30, that is formed from glass, to the main surface 50a of the cover 50, that is formed from glass. Furthermore, the first adhesive layer 60 of the present embodiment directly adheres the exposure region 35, within the detection region 32 of the first main surface 30a, to the main surface 50a of the cover 50. Accordingly, it is possible to prevent the surrounding region 34 and the detection region 32 (the exposure region 35) of the base 30 from peeling from the first adhesive layer 60 and, thus, the safety of the touch panel 10 can be enhanced.

Embodiment 5

In the display device 200 of Embodiment 1, the detection region 32 of the second main surface 30b of the base 30 of the touch panel 10 and the display region 111 (the display surface 110a) of the liquid crystal display panel 110 exposed through the opening 138 of the bezel 136 are adhered to each other by the adhesive layer 150. However, a configuration is possible in which the second main surface 30b of the base 30 of the touch panel 10 is directly adhered to the periphery region 112 of the main surface 115b of the counter substrate 115 of the liquid crystal display panel 110.

The configuration of a touch panel 10 of the present embodiment is the same as that of the touch panel 10 of Embodiment 1. Here, a display 100 and a display device 200 of the present embodiment are described.

As in Embodiment 1, the display 100 of the present embodiment includes a liquid crystal display panel 110, a back light 120, and a housing 130. The configuration of the back light 120 of the present embodiment is the same as that of Embodiment 1 and, as such, the liquid crystal display panel 110 and the housing 130 of the present embodiment are described.

Figure 21:
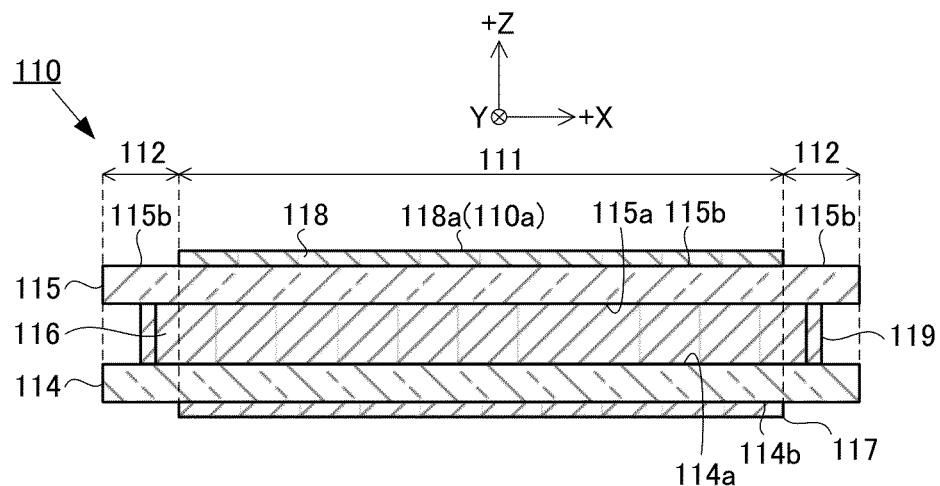
FIG. 21 is a cross-sectional view illustrating a liquid crystal display panel according to Embodiment 5.

As in Embodiment 1, the liquid crystal display panel 110 of the present embodiment includes a TFT substrate 114, a counter substrate 115, a liquid crystal 116, a first polarizing plate 117, and a second polarizing plate 118. In the present embodiment, as illustrated in FIG. 21, a first polarizing plate 117 is provided in a display region 111 of a main surface 114b of the TFT substrate 114, and is not provided in a periphery region 112. The second polarizing plate 118 of the present embodiment is provided in the display region 111 of a main surface 115b of the counter substrate 115, and is not provided in the periphery region 112. In the present embodiment, nothing is formed in the periphery region 112 of the main surface 115b of the counter substrate 115. Accordingly, the main surface 115b of the counter substrate 115 is exposed in the periphery region 112. The other configurations of the liquid crystal display panel 110 of the present embodiment are the same as the configurations of the liquid crystal display panel 110 of Embodiment 1.

Figure 22:
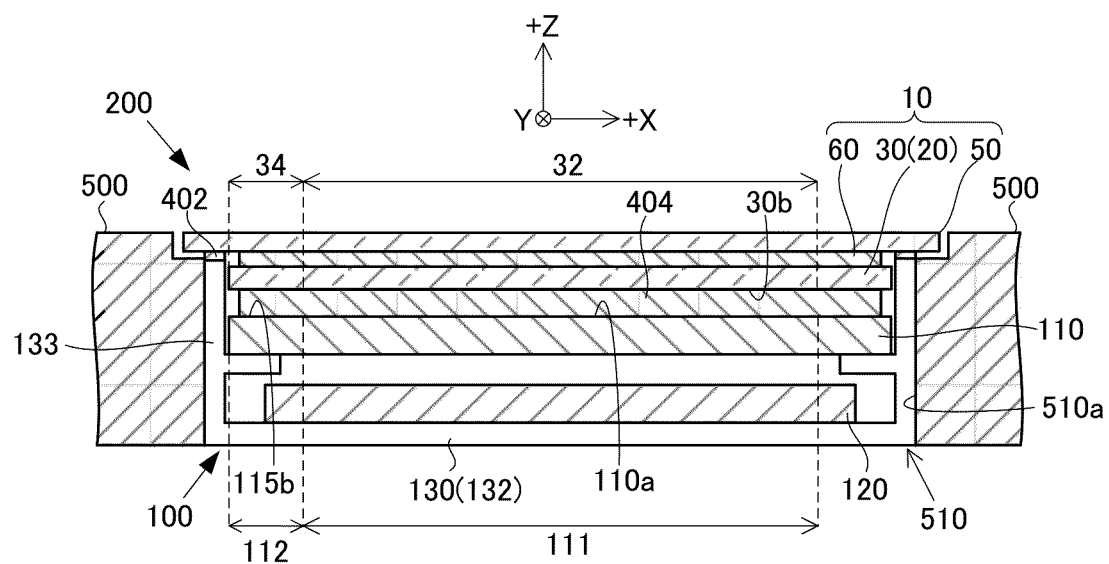
FIG. 22 is a cross-sectional view illustrating a display device according to Embodiment 5.

As illustrated in FIG. 22, the housing 130 of the present embodiment includes only a chassis 132 that accommodates the liquid crystal display panel 110 and the back light 120, and does not include a bezel 136. In the present embodiment, the cover 50 is adhered to a side plate 133 of the chassis 132 by an adhesive 402. Note that the configurations of the touch panel 10 and the liquid crystal display panel 110 are simplified in FIG. 22.

The display device 200 of the present embodiment includes the touch panel 10, the display 100 described above, and a second adhesive layer 404. The second adhesive layer 404 adheres the touch panel 10 to the display 100. As with the first adhesive layer 60, the second adhesive layer 404 is formed from a polyvinyl acetal resin (for example polyvinyl butyral).

Figure 23:
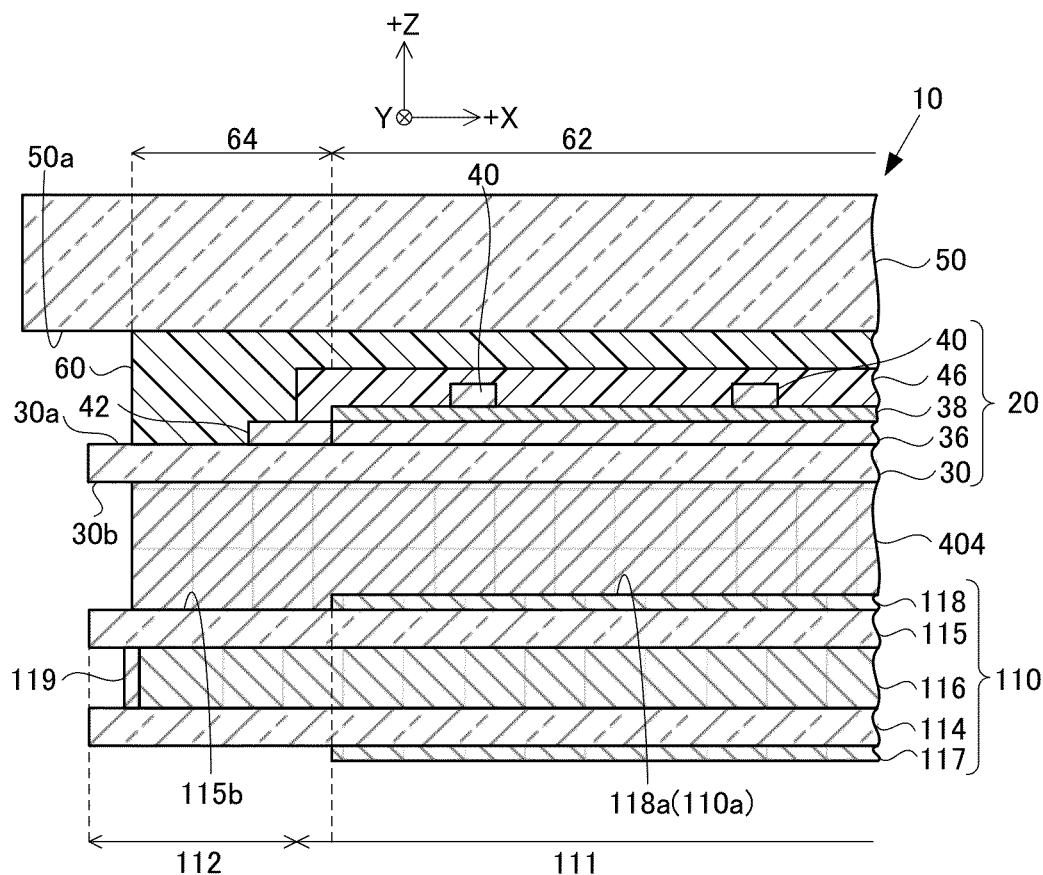
FIG. 23 is a cross-sectional view illustrating a touch panel and the liquid crystal display panel according to Embodiment 5.

Specifically, as illustrated in FIG. 23, the second adhesive layer 404 adheres the display region 111 (the display surface 110a) of the liquid crystal display panel 110 to the second main surface 30b of the base 30. Furthermore, the second adhesive layer 404 directly adheres the periphery region 112 of the main surface 115b of the counter substrate 115 to the second main surface 30b of the base 30.

In the present embodiment, the base 30 and the counter substrate 115 are formed from glass and, as such, the second adhesive layer 404 can firmly adhere the periphery region 112 of the main surface 115b of the counter substrate 115 to the second main surface 30b of the base 30 and, thus, can prevent the periphery region 112 of the liquid crystal display panel 110, of which fragments are more likely to scatter broadly, from peeling from the second adhesive layer 404. As a result, the safety of display device 200 can be further enhanced.

Embodiment 6

In Embodiment 5, the display 100 includes the liquid crystal display panel 110. However, a configuration is possible in which the display 100 includes a micro LED display panel 610. The configuration of a touch panel 10 of the present embodiment is the same as that of the touch panel 10 of Embodiment 1. Here, a display 100 and a display device 200 of the present embodiment are described.

Figure 24:
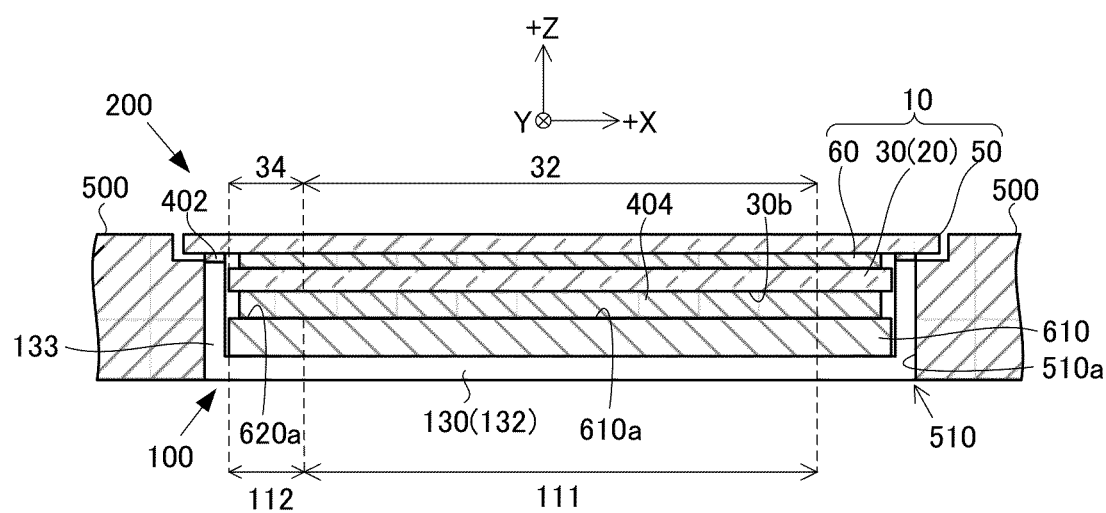
FIG. 24 is a cross-sectional view illustrating a display device according to Embodiment 6.

As illustrated in FIG. 24, the display 100 of the present embodiment includes a micro LED display panel 610, and a housing 130. Note that the configurations of the touch panel 10 and the micro LED display panel 610 are simplified in FIG. 24.

Figure 25:
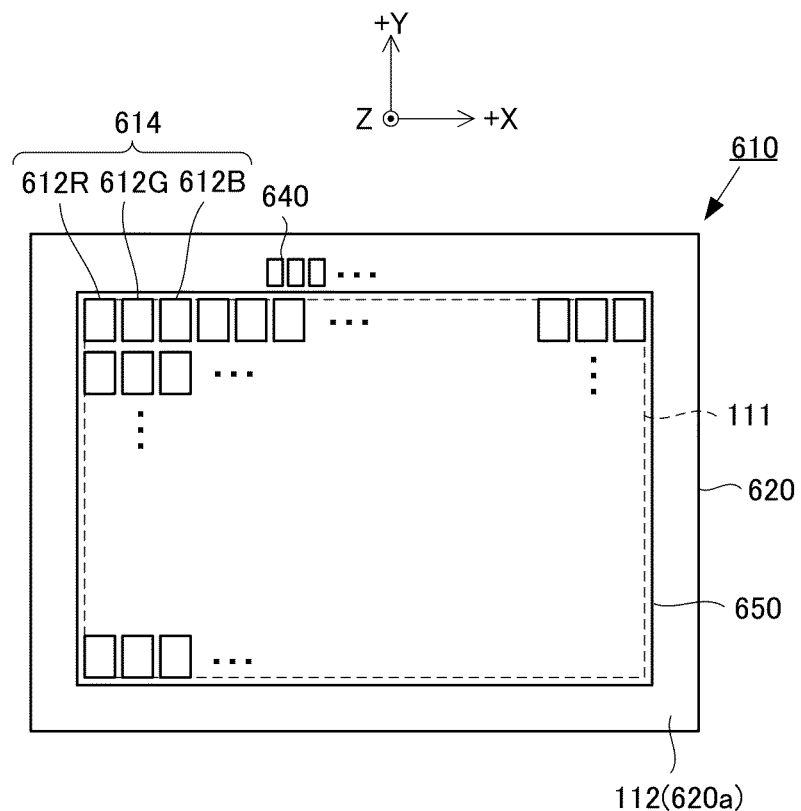
FIG. 25 is a plan view illustrating a micro LED display panel according to Embodiment 6.

As with the liquid crystal display panel 110 of Embodiment 1, the micro LED display panel 610 includes a display region 111 and a periphery region 112. As illustrated in FIG. 25, a pixel 612R that emits red display light, a pixel 612G that emits green display light, and a pixel 612B that emits blue display light are arranged in the display region 111. A terminal 640, described later, is disposed in a portion of the periphery region 112.

The pixel 612R, the pixel 612B, and the pixel 612G are arranged in the +X direction to form a single main pixel 614. The main pixel 614 is arranged in a matrix. The pixel 612R, the pixel 612B, and the pixel 612G are respectively arranged in rows in the Y direction.

Figure 26:
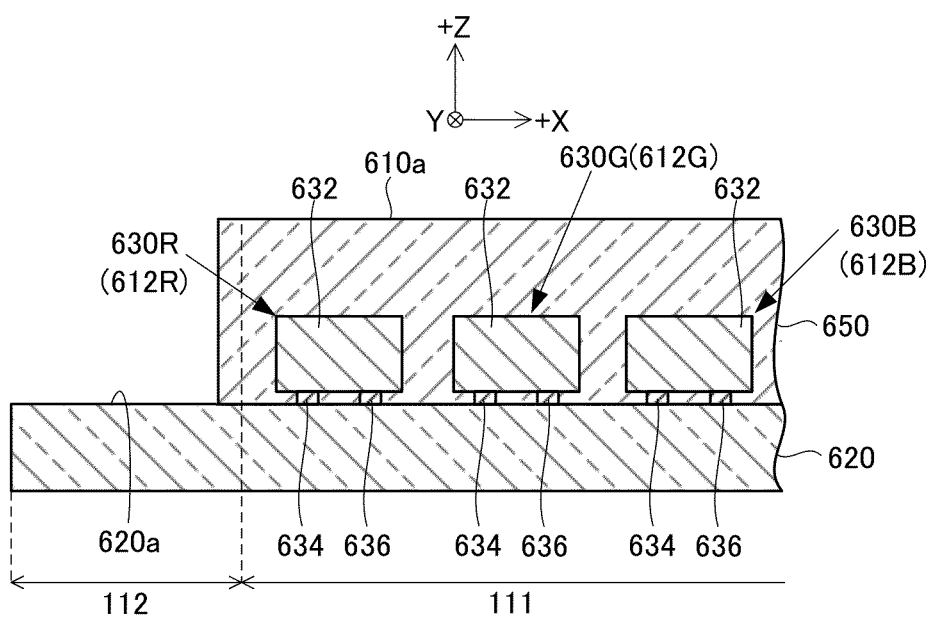
FIG. 26 is a cross-sectional view illustrating the micro LED crystal display panel according to Embodiment 6.

As illustrated in FIG. 26, the micro LED display panel 610 includes a wiring board 620, micro LED display elements 630R, 630G, 630B, and a sealer 650.

The wiring board 620 is formed of glass in a flat shape. The wiring board 620 includes wirings (not illustrated), that supply power to each of the micro LED elements 630R, 630G, 630B, in the display region 111 of a main surface (+Z side main surface) 620a on which each of the micro LED elements 630R, 630G, 630B is mounted.

As illustrated in FIG. 25, the wiring board 620 includes a terminal 640, that connects to the wirings, in a portion (the +Y side end) of the periphery region 112 of the main surface 620a. The terminal 640 is a terminal for connecting to outside the micro LED display panel 610. In the present embodiment, the terminal 640 is connected to a driver integrated circuit (IC) via an FPC (not illustrated).

As illustrated in FIG. 26, each of the micro LED display elements 630R, 630G, 630B is mounted in the display region 111 of the main surface 620a of the wiring board 620 to form each of the pixels 612R, 612B, 612G. The micro LED display element 630R emits red display light, and the micro LED display element 630G emits green display light. The micro LED display element 630B emits blue display light.

Each of the micro LED display elements 630R, 630G, 630B includes a micro LED chip 632, a cathode electrode 634, and an anode electrode 636. The micro LED chip 632 emits the display light. The cathode electrode 634 and the anode electrode 636 are connected to the wiring of the wiring board 620.

Emission intensity (intensity of the display light) of the micro LED display element 630R, the micro LED display element 630G, and the micro LED display element 630B is independently adjusted by the power supplied from the driver IC via the wiring. As a result, display elements are displayed on the micro LED display panel 610.

In one example, the sealer 650 is formed from a light-transmitting resin. The sealer 650 is provided on the main surface 620a of the wiring board 620. The sealer 650 covers and protects the micro LED display elements 630R, 630G, 630B, the wirings, and the like. In the present embodiment, the +Z side surface of the sealer 650 corresponds to a display surface 610a of the micro LED display panel 610. The sealer 650 may cover a portion of the periphery region 112 of the main surface 620a. However, the sealer 650 does not cover the entirety of the periphery region 112 of the main surface 620a. Accordingly, in the periphery region 112, at least a portion of the main surface 620a of the wiring board 620 is exposed.

The housing 130 of the present embodiment includes a chassis 132 that accommodates the micro LED display panel 610. The cover 50 is adhered to a side plate 133 of the chassis 132 by an adhesive 402.

As illustrated in FIG. 24, the display device 200 of the present embodiment includes the touch panel 10, the display 100 described above, and a second adhesive layer 404. As in Embodiment 5, the second adhesive layer 404 of the present embodiment adheres the touch panel 10 to the display 100. The second adhesive layer 404 of the present embodiment is formed from a polyvinyl acetal resin (for example, polyvinyl butyral).

Figure 27:
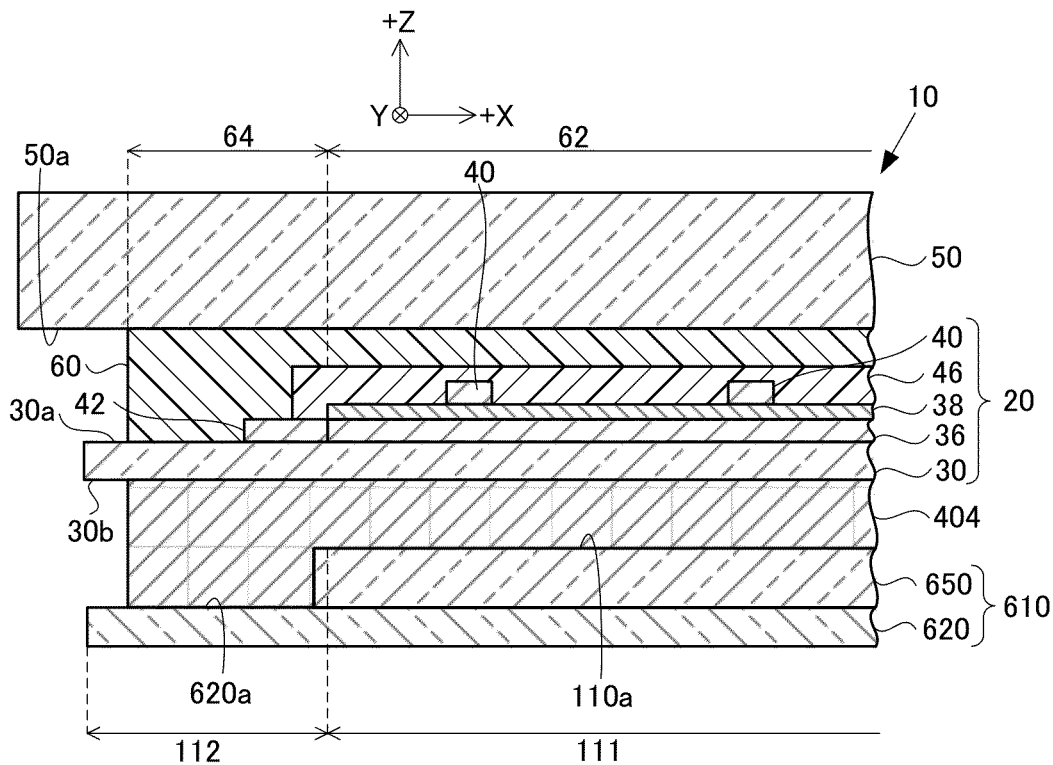
FIG. 27 is a cross-sectional view illustrating a touch panel and the micro LED crystal display panel according to Embodiment 6.

As illustrated in FIG. 27, the second adhesive layer 404 of the present embodiment adheres the micro LED display panel 610 to the second main surface 30b of the base 30. Furthermore, the second adhesive layer 404 of the present embodiment directly adheres the periphery region 112 of the main surface 620a of the wiring board 620 to the second main surface 30b of the base 30. The micro LED display elements 630R, 630G, 630B are omitted from FIG. 27.

In the present embodiment, the base 30 and the wiring board 620 are formed from glass and, as such, the second adhesive layer 404 can firmly adhere the periphery region 112 of the main surface 620a of the wiring board 620 to the second main surface 30b of the base 30, and can prevent the periphery region 112 of the micro LED display panel 610, of which fragments are more likely to scatter broadly, from peeling from the second adhesive layer 404. As a result, the safety of display device 200 can be further enhanced.

MODIFIED EXAMPLES

Embodiments have been described, but various modifications can be made to the present disclosure without departing from the spirit and scope of the present disclosure.

For example, a configuration is possible in which the cover 50 of the touch panel 10 is formed from tempered glass (for example, chemically strengthened aluminosilicate glass), laminated glass, or the like.

A configuration is possible in which the main surface (user-side surface) of the side opposite the main surface 50a of the cover 50 is subjected to various types of treatments. For example, the main surface on the user side of the cover 50 may be subjected to a low reflection treatment. Furthermore, an anti-scattering film may be provided on the main surface on the user side of the cover 50.

In the embodiments, the second electrodes 40 of the touch panel 10 are provided on the base 30. However, a configuration is possible in which the second electrodes 40 are provided on another base positioned on the −Z side of the base 30. In one example, the second electrodes 40 provided on the other base are covered by an organic thin film, and the other base is adhered to the base 30 by an adhesive layer.

Figure 28:
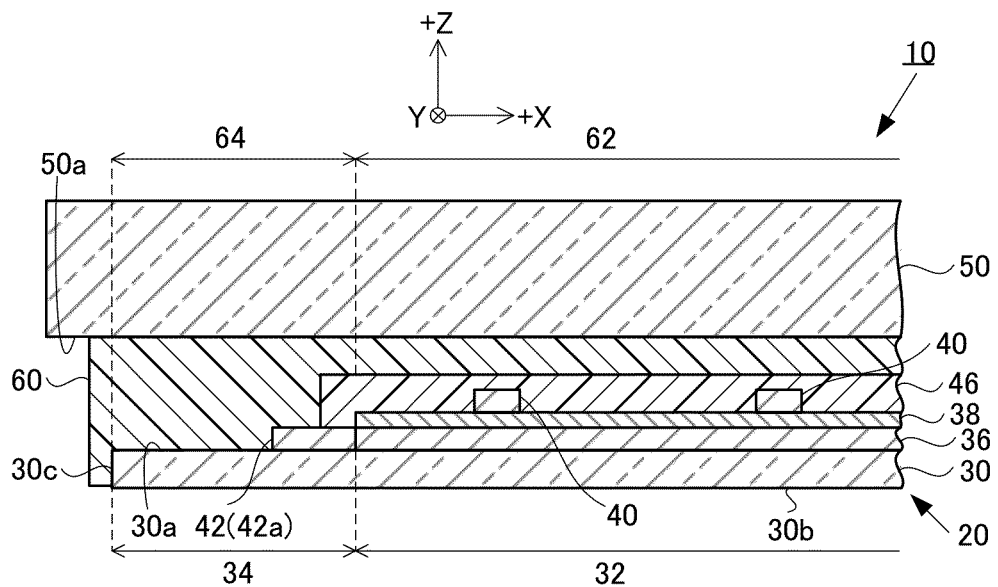
FIG. 28 is a cross-sectional view illustrating a touch panel according to a modified example.

In the embodiments, the first adhesive layer 60 of the touch panel 10 is positioned between the first substrate 20 and the cover 50. However, a configuration is possible in which, as illustrated in FIG. 28, the first adhesive layer 60 extends from the surrounding region 34 of the first main surface 30a of the base 30 to a side surface 30c of the base 30. With such a configuration, the first adhesive layer 60 can more firmly adhere the surrounding region 34 of the first main surface 30a of the base 30, and the main surface 50a of the cover 50.

In the embodiments, the first adhesive layer 60 of the touch panel 10 is formed from a polyvinyl acetal resin. However, a configuration is possible in which the first adhesive layer 60 is formed from a tough material having strong adhesion to glass, similar to a polyvinyl acetal resin.

It is preferable that a width (for example, a length in the X direction or a length in the Y direction) across which the first adhesive layer 60 of the touch panel 10 directly adheres the surrounding region 34 of the first main surface 30a to the main surface 50a of the cover 50 is 1 mm or greater. With such a configuration, it is possible to prevent large fragments from peeling from the first adhesive layer 60.

In Embodiments 1 to 6, the display 100 includes the liquid crystal display panel 110, and the back light 120 or the micro LED display panel 610. However, a configuration is possible in which the display 100 includes a different display panel. For example, a configuration is possible in which the display 100 includes an organic electro-luminescence (EL) display panel instead of the liquid crystal display panel 110 and the back light 120.

A configuration is possible in which the touch panel 10 of Embodiments 2 and 3 includes an exposure region 35 in which the first main surface 30a is exposed, as with the touch panel 10 of Embodiment 4. Additionally, a configuration is possible in which the touch panel 10 of Embodiment 2 includes an exposure region 35 in which the first main surface 30a is exposed in a region, within the detection region 32, where the first electrodes 36 are not disposed.

A configuration is possible in which the display device 200 of Embodiments 5 and 6 includes the touch panel 10 of Embodiments 2 to 4.

It is preferable that a width (for example, a length in the X direction or a length in the Y direction) across which the second adhesive layer 404 of Embodiments 5 and 6 directly adheres the periphery region 112 of the main surface 115b of the counter substrate 115 or the periphery region 112 of the main surface 620a of the wiring board 620 to the second main surface 30b of the base 30 is 1 mm or greater. With such a configuration, it is possible to prevent large fragments from peeling from the second adhesive layer 404.

A configuration is possible in which the micro LED display panel 610 of Embodiment 6 includes, within the display region 111, a region in which the main surface 620a of the wiring board 620 is exposed from the sealer 650. With such a configuration, the second adhesive layer 404 can directly adhere the main surface 620a of the wiring board 620 to the second main surface 30b of the base 30 within the display region 111 as well, and can more firmly adhere the touch panel 10 to the display 100.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A touch panel, comprising:
a first substrate;
a cover that is formed from glass and that is overlaid on the first substrate; and
a first adhesive layer that adheres the first substrate to the cover, wherein
the first substrate includes
a base that is formed from glass and includes a first main surface including a detection region and a surrounding region surrounding the detection region,
a plurality of first electrodes that is disposed in the detection region of the first main surface of the base, and that extends in a first direction, and
an organic thin film that is formed on the first main surface of the base, and that covers the plurality of first electrodes, and
the first adhesive layer directly adheres the organic thin film to the cover, and the surrounding region of the first main surface of the base to the cover.

2. The touch panel according to claim 1, wherein
the first substrate includes a plurality of second electrodes that is disposed in the detection region of the first main surface of the base, and that extends in a second direction crossing the first direction, and
the organic thin film covers the plurality of first electrodes and the plurality of second electrodes.

3. The touch panel according to claim 1, wherein the first substrate includes a plurality of second electrodes that is disposed on a second main surface of a side, of the base, opposite the first main surface, and that extends in a second direction crossing the first direction.

4. The touch panel according to claim 1, wherein the cover includes a decoration in a region, of a main surface opposing the first main surface of the base, corresponding to the surrounding region.

5. The touch panel according to claim 1, wherein adhesion, of the first adhesive layer, adhering the surrounding region of the first main surface of the base to the cover is greater than adhesion, of the first adhesive layer, adhering the organic thin film to the cover.

6. The touch panel according to claim 1, wherein the first adhesive layer extends from the surrounding region of the first main surface of the base to a side surface, continuous with the first main surface of the base, of the base.

7. The touch panel according to claim 1, wherein the first adhesive layer is formed from a polyvinyl acetal resin.

8. The touch panel according to claim 1, wherein
the first main surface of the base includes, in the detection region, an exposure region in which the first main surface is exposed from the organic thin film, and
the first adhesive layer directly adheres the cover to the exposure region.

9. A display device, comprising:
the touch panel according to claim 1; and
a display panel overlaid on the touch panel.

10. The display device according to claim 9, wherein the touch panel is adhered to the display panel.

11. A display device, comprising:
the touch panel according to claim 1;
a display panel that is overlaid on the touch panel, and that includes a display region that displays a display element and a periphery region adjacent to the display region; and
a second adhesive layer that adheres the touch panel to the display panel, wherein
the display panel includes a substrate formed from glass,
the substrate of the display panel includes a main surface opposing a second main surface of the base and including the periphery region, the second main surface being provided on a side opposite the first main surface of the base, and
the second adhesive layer directly adheres the second main surface of the base to a region corresponding to the periphery region of the main surface of the substrate of the display panel.

* * * * *